US010200548B2

(12) United States Patent
Kimura

(10) Patent No.: US 10,200,548 B2
(45) Date of Patent: Feb. 5, 2019

(54) IMAGE PROCESSING APPARATUS, IMAGE PROCESSING METHOD, AND RECORDING MEDIUM

(71) Applicant: Jun Kimura, Tokyo (JP)

(72) Inventor: Jun Kimura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/479,594

(22) Filed: Apr. 5, 2017

(65) Prior Publication Data
US 2017/0310829 A1    Oct. 26, 2017

(30) Foreign Application Priority Data

Apr. 22, 2016  (JP) .................................. 2016-086434
Feb. 8, 2017   (JP) .................................. 2017-021338

(51) Int. Cl.
*G06F 3/12* (2006.01)
*H04N 1/00* (2006.01)
*H04N 1/21* (2006.01)
*G06K 15/02* (2006.01)

(52) U.S. Cl.
CPC ......... *H04N 1/0023* (2013.01); *G06F 3/1203* (2013.01); *G06F 3/1222* (2013.01); *G06F 3/1236* (2013.01); *G06F 3/1238* (2013.01); *G06F 3/1286* (2013.01); *H04N 1/00411* (2013.01); *H04N 1/2104* (2013.01); *H04N 2201/0094* (2013.01)

(58) Field of Classification Search
None
See application file for complete search history.

(56) References Cited

U.S. PATENT DOCUMENTS

| 7,952,736 B2* | 5/2011 | Kasatani ............ H04N 1/00127 358/1.13 |
| 9,769,339 B2* | 9/2017 | Ono .................... H04N 1/00474 |
| 2001/0017701 A1* | 8/2001 | Ito ............................ B41J 13/12 358/1.1 |

(Continued)

FOREIGN PATENT DOCUMENTS

| JP | 2008-040845 | * 2/2008 | ............... G06F 3/12 |
| JP | 2014-008702 | 1/2014 | |

(Continued)

*Primary Examiner* — Beniyam Menberu
(74) *Attorney, Agent, or Firm* — Oblon, McClelland, Maier & Neustadt, L.L.P.

(57) ABSTRACT

An image processing apparatus includes circuitry that receives a list of file identification information from an external apparatus that stores, for one or more files to be output, file identification information for identifying the file to be output connected to the image processing apparatus via a network, registers, in a memory, output information including file identification information of a first file at least one file of the one or more files that has been output, and based on a result of comparing the list of the file identification information that is received with the file identification information included in the output information, controls a display to display a screen for selecting a file to be output, the screen indicating at least one of the first file and a second file, the second file being at least one file of the one or more files that has not been output.

14 Claims, 20 Drawing Sheets

(56) References Cited

U.S. PATENT DOCUMENTS

| | | | | |
|---|---|---|---|---|
| 2002/0171872 A1* | 11/2002 | Matsunaga | H04N 1/00291 | 358/1.18 |
| 2003/0065531 A1* | 4/2003 | Satomi | G06Q 30/06 | 705/26.35 |
| 2006/0221359 A1* | 10/2006 | Mokuya | G06F 3/1207 | 358/1.1 |
| 2006/0288304 A1* | 12/2006 | Nomoto | G06F 17/30126 | 715/781 |
| 2008/0030762 A1* | 2/2008 | Morita | G06F 3/1205 | 358/1.14 |
| 2008/0079999 A1* | 4/2008 | Yamada | H04N 1/00278 | 358/1.15 |
| 2008/0165372 A1* | 7/2008 | Yamada | B41J 3/44 | 358/1.4 |
| 2008/0259397 A1* | 10/2008 | Uehara | H04N 1/00244 | 358/1.15 |
| 2009/0174894 A1* | 7/2009 | Kamijo | G06F 21/608 | 358/1.15 |
| 2010/0097628 A1* | 4/2010 | Masuda | G06F 3/1222 | 358/1.14 |
| 2010/0123918 A1* | 5/2010 | Matsuo | H04N 1/00384 | 358/1.13 |
| 2010/0202016 A1* | 8/2010 | Matsuzawa | H04N 1/00233 | 358/1.15 |
| 2012/0311189 A1* | 12/2012 | Yamada | G06F 21/6272 | 709/248 |
| 2012/0327463 A1* | 12/2012 | Mizuno | G06F 3/122 | 358/1.15 |
| 2013/0061335 A1* | 3/2013 | Schwabe | G06F 21/6218 | 726/28 |
| 2014/0211238 A1* | 7/2014 | Nakajima | G06F 3/1238 | 358/1.14 |
| 2015/0029551 A1* | 1/2015 | Okada | G06K 15/1894 | 358/1.15 |
| 2015/0070726 A1* | 3/2015 | Umezawa | H04N 1/00416 | 358/1.15 |
| 2015/0082457 A1 | 3/2015 | Nakamura et al. | | |

FOREIGN PATENT DOCUMENTS

| | | |
|---|---|---|
| JP | 2015-012336 | 1/2015 |
| JP | 2015-084204 | 4/2015 |

\* cited by examiner

FIG. 6

INFORMATION ON FINISHED PRINT

| PRINT DATE/TIME | FILE NAME OF PRINT FILE | DATE/TIME WHEN PRINT FILE IS UPDATED |
|---|---|---|
| 2016/03/24/12:00:00 | \\192.168.0.1\SharedFiles\POPFiles\FlyerA.pdf | 2016/02/25/13:00:05 |
| 2016/03/24/12:05:00 | \\192.168.0.1\SharedFiles\POPFiles\FlyerB.pdf | 2016/03/14/18:50:00 |

FIG. 7

CACHE MANAGEMENT INFORMATION

| FILE NAME OF PRINT FILE | DATE/TIME WHEN THUMBNAIL IS GENERATED | PATH WHERE THUMBNAIL IS REGISTERED |
|---|---|---|
| \\192.168.0.1\SharedFiles\POPSample\SALE.pdf | 2016/02/27/12:00:30 | Cache\1231248yt3.jpg |
| \\192.168.0.1\SharedFiles\POPFiles\FlyerB.pdf | 2016/03/14/19:00:00 | Cache\h0320f09hf2.jpg |

FIG. 8

SERVER ADDRESS INPUT SCREEN

① CONNECT TO COMPUTER ▷ ② ▷ ③

CONNECT TO COMPUTER INCLUDING SHARED FOLDER
INPUT IP ADDRESS OR COMPUTER NAME

| COMPUTER NAME OR IP ADDRESS | NOT INPUT YET | ~a k

BACK　　　　　　　　　　　　　　　　　NEXT

CHECK STATUS　　　　　　　　　　　　　　STOP

FIG. 9

AUTHENTICATION INFORMATION INPUT SCREEN (!) INPUT USER ID AND PASSWORD

| USER ID | NOT INPUT YET | ~b
| PASSWORD | NOT INPUT YET | ~c

BACK ~d　　　　　　e~ NEXT

CHECK STATUS　　　　　　　　　　　　　　STOP

FIG. 16

| ITEM | SPECIFIC CONTENT |
|---|---|
| COMMAND | "ACQUIRE LIST OF FILE NAMES AND UPDATE DATE/TIME" |
| FOLDER NAME | "¥¥192.168.0.1¥SharedFiles¥POPFiles" |
| USER ID (AUTHENTICATION INFORMATION) | "userB" |
| PASSWORD (AUTHENTICATION INFORMATION) | "password" |

FIG. 17

| ITEM | DATA TYPE | SPECIFIC CONTENT |
|---|---|---|
| TYPE | FLAG | FOLDER/PRINT FILE |
| NAME | STRING | "¥¥192.168.0.1¥SharedFiles¥POPFiles¥FlyerA.pdf" |
| ACCESS PERMISSION INFORMATION | FLAG | READ/WRITE, READ ONLY, INACCESSIBLE |
| OWNER | STRING | "userB" |
| CREATION DATE/TIME | INTEGER | 2016/02/25/13:00:05 |
| LAST UPDATED DATE/TIME | INTEGER | 2016/02/25/13:00:05 |
| SIZE (IN UNITS OF BYTE) | INTEGER | 1048576 |

FIG. 18

| TYPE | NAME | ACCESS PERMISSION INFORMATION | OWNER | CREATION DATE/TIME | LAST UPDATED DATE/TIME | SIZE |
|---|---|---|---|---|---|---|
| FILE | "¥¥192.168.0.1¥SharedFiles ¥POPFiles¥FlyerA.pdf" | READ/WRITE | userB | 2016/02/25/13:00:05 | 2016/02/25/13:00:05 | 1048576 |
| FILE | "¥¥192.168.0.1¥SharedFiles ¥POPFiles¥FlyerB.pdf" | READ ONLY | userB | 2016/03/14/18:50:00 | 2016/03/16/15:30:00 | 2359296 |
| FILE | "¥¥192.168.0.1¥SharedFiles ¥POPFiles¥FlyerC.pdf" | READ/WRITE | userC | 2016/03/18/17:20:00 | 2016/03/14/17:20:00 | 156380 |
| FOLDER | "¥¥192.168.0.1¥SharedFiles ¥POPFiles¥FolderA" | READ/WRITE | userA | 2016/02/01/11:00:00 | 2016/03/01/11:30:00 | 0 |

FILE LIST DISPLAY SCREEN

PLEASE SELECT FILE TO BE PRINTED

POP SAMPLE

- NOT PRINTED YET (P1a) — SALE.pdf (P1)
- PRINTED (P2a) — RECOMMENDED BY STORE MANAGER! — image.pdf (P2)
- PRINTED (P3a) — Special SALE — SpecialSale (1).pdf (P3)
- PRINTED (P4a) — ¥118 — toitiyagekan.pdf (P4)
- NOT PRINTED YET (P5a) — PDF — _82BB82CC825031... (P5)
- PRINTED (P6a) — ¥580 — yamazawa.pdf (P6)

DISPLAY ALL FILES
FILE NAME (ASCENDING ORDER)

INITIAL SETTINGS  D40-2

NUMBER OF SELECTED ITEMS: 0
PREVIEW >
NUMBER OF COPIES    1
FULL COLOR
SIMPLEX
PRINT SETTINGS >

PRINT

CHECK STATUS     STOP

IMAGE PROCESSING APPARATUS, IMAGE PROCESSING METHOD, AND RECORDING MEDIUM

CROSS-REFERENCE TO RELATED APPLICATION

This patent application is based on and claims priority pursuant to 35 U.S.C. § 119(a) to Japanese Patent Applications No. 2016-086434, filed on Apr. 22, 2016 and No. 2017-021338, filed on Feb. 8, 2017 in the Japan Patent Office, the entire disclosure of which is hereby incorporated by reference herein.

BACKGROUND

Technical Field

The present invention relates to an image processing apparatus, an image processing method, and a non-transitory recording medium storing an image processing program.

Background Art

A pull-print function that performs printing without information processing apparatuses such as a personal computer (PC) by accessing a file server directly from an image processing apparatus and acquiring a print document (i.e., a file to be printed) is known. In addition, in a printing method using the pull-print function, a technology that manages and displays whether or not the print document has already been printed.

For example, a document management system that prints print data that has not been output yet only instead of printing document data that has already been printed is known. In the document management system, the document that has not been output yet is managed by storing information on printed data indicating whether or not the document data has already been printed in a report management server (i.e., a file server).

SUMMARY

Example embodiments of the present invention provide a novel image processing apparatus that includes circuitry that receives a list of file identification information from an external apparatus connected to the image processing apparatus via a network, the external apparatus being configured to store, for one or more files to be output, file identification information for identifying the file to be output, registers, in a memory, output information including file identification information of a first file, the first file being at least one file of the one or more files that has been output, and based on a result of comparing the list of the file identification information that is received with the file identification information included in the output information, controls a display to display a screen for selecting a file to be output, the screen indicating at least one of the first file and a second file, the second file being at least one file of the one or more files that has not been output.

Further example embodiments of the present invention provide a method of processing an image and a non-transitory recording medium storing an image processing program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 6 is a diagram illustrating finished print information registered in a memory in the MFP as an example embodiment of the present invention;

FIG. 7 is a diagram illustrating cache management information registered in the memory in the MFP as an example embodiment of the present invention;

FIG. 8 is a diagram illustrating a server address input screen as an example embodiment of the present invention;

FIG. 9 is a diagram illustrating an authentication information input screen as an example embodiment of the present invention;

FIG. 16 is a diagram illustrating an operation of sending a folder name of the authentication information and root folder that the MFP transfers to the file server and requesting the list of file names and update date/time as an example embodiment of the present invention;

FIG. 17 is a diagram illustrating the list of file names and update date/time that the MFP receives from the file server as an example embodiment of the present invention;

FIG. 18 is a diagram illustrating the list of file names and update date/time that the file server transfers to the MFP as an example embodiment of the present invention;

FIG. 23A is a diagram illustrating another file list display screen as an example embodiment of the present invention, and FIG. 23B is a diagram illustrating yet another file list display screen as an example embodiment of the present invention.

Figure 1:
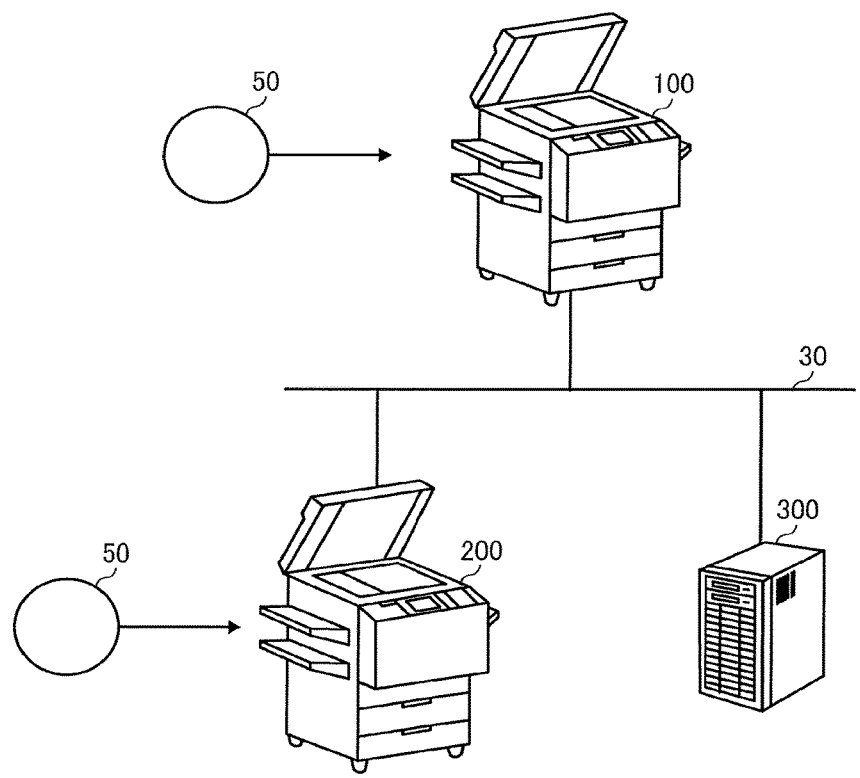
FIG. 1 is a diagram illustrating an entire configuration of the image processing system in this embodiment.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

FIG. 1 is a diagram illustrating a configuration of a whole image processing system in this embodiment. As illustrated in FIG. 1, in the image processing system, MFPs 100 and 200 are communicably connected to a file server 300 via a network 30.

In the image processing system in this embodiment, for example, at a marketing department of a trading company, a sales representative creates a file to be printed for advertisement such as a point of purchase advertising (e.g., word file, PDF file, or JPEG file etc.) and stores the created file in a file server. Subsequently, a salesclerk at a retailing store accesses the file server using a MFP located at the store, acquires the file to be printed (e.g., a print file), and print out the file to display the printed advertisement in the store. As a result, it is possible to print out a common advertisement among stores and display the advertisement in the store.

The MFPs 100 and 200 each include various functions such as a copy function, scan function (scanner function), facsimile function, and print function etc. as an example of an image processing apparatus. In the image processing system illustrated in FIG. 1, two MFPs 100 and 200 are connected. However, it is possible to connect one MFP or three or more MFPs. In the MFPs 100 and 200, a print application 50 is installed.

The print application 50 is software that provides a function of printing (outputting) a print file (a file to be printed) such as image data and a document etc. on a recording medium such as paper etc. using functions included in the MFPs 100 and 200. For example, the printer application 50 is an application written in Java® running on Android® executed in an operation unit 20 (illustrated in FIG. 3 etc.). In this embodiment, the print application 50 is the application installed in the MFPs 100 and 200. However, the print application 50 can be a web-type application operable using the MFPs 100 and 200 via a browser application. The print application 50 is an example of an application that provides a function of outputting a file to be output. Examples of outputting the file are sending e-mail attached a file, transferring a file, and sending facsimile etc.

The file server 300 is an apparatus that stores a print file such as an image and a document etc. with a format printable by the MFPs 100 and 200 and information on the print file etc. and an example of an external apparatus. The file server 300 transfers the print file etc. in response to a request from the MFPs 100 and 200 and stores various information on the print file.

For example, Server Message Block (SMB) widely used as a network file sharing protocol can be used for communication between the MFPs 100 and 200 and the file server 300. The print application 50 accesses the print file stored in the folder in the generic file server 300 and the PC using SMB protocol as the file sharing protocol. It should be noted that Common Internet File System (CIFS) and Web-based Distributed Authoring and Versioning (WebDAV) may be used as the file sharing protocol. As another example of the print application 50, it is possible to use a scheme that accesses a file in an online storage using Web Application Programming Interface (WebAPI).

Figure 2:
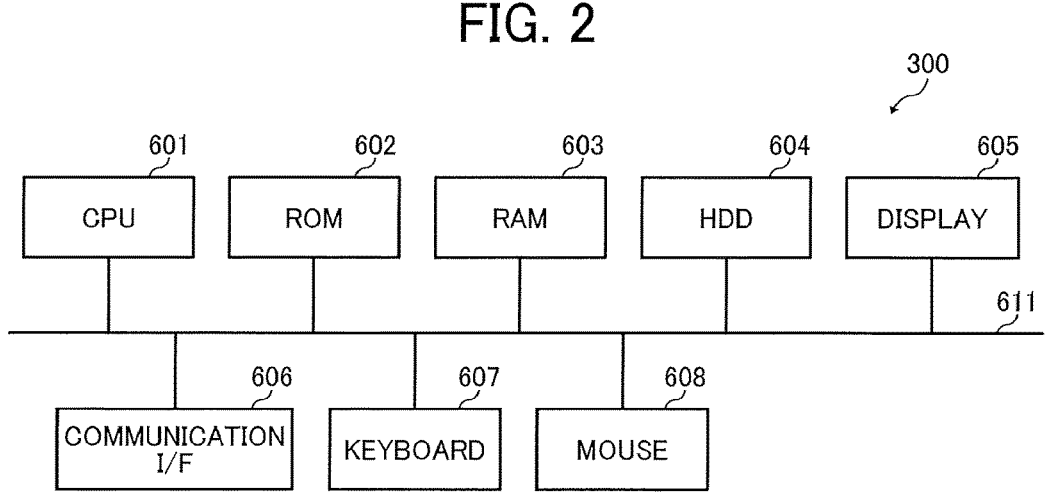
FIG. 2 is a block diagram illustrating the hardware configuration of a file server according to an example embodiment of the present invention.

The hardware configuration of the file server 300 is described below. FIG. 2 is a block diagram illustrating the hardware configuration of a file server in this embodiment. As illustrated in FIG. 2, the file server 300 includes a central processing unit (CPU) 601, read only memory (ROM) 602, random access memory (RAM) 603, a hard disk drive (HDD) 604, a display 605, a communication interface (I/F) 606, a keyboard 607, and a mouse 608.

The CPU 601 controls the entire file server 300. The CPU 601 controls the entire file server 300 by executing a program stored in the ROM 602 and the HDD 604 etc. using the RAM 603 as a work area.

The display 605 displays various information such as text and an image etc. Examples of the display 605 are cathode ray tube (CRT) display, a liquid crystal display (LCD), and an organic electro-luminescence (EL) display etc.

The communication I/F 606 is an interface for connecting to the network 30 and perform data communication. For example, the communication I/F 606 is an interface compatible with Ethernet® such as 10 Base-T, 100 Base-TX, and 1000 Base-T etc.

The keyboard 607 is an input device used for inputting text and numbers and selecting various commands etc. The mouse 608 is an input device used for selecting or executing various commands, and selecting a target to be processed etc.

The CPU 601, the ROM 602, the RAM 603, the HDD 604, the display 605, the communication I/F 606, the keyboard 607, and the mouse 608 are communicably connected with each other via a bus 611 such as an address bus and data bus etc.

Figure 3:
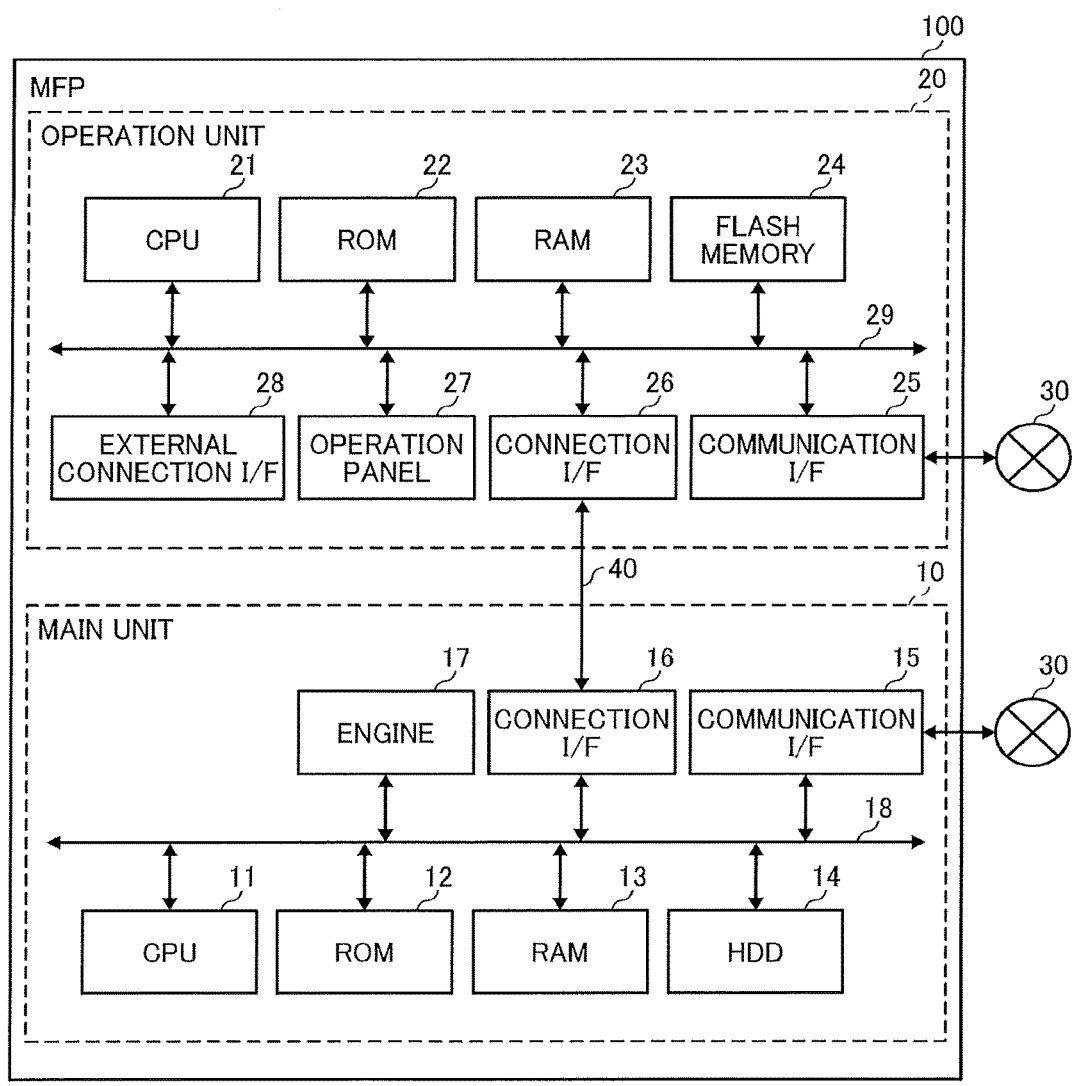
FIG. 3 is a block diagram illustrating the hardware configuration of a multifunction peripheral (MFP) according to an example embodiment of the present invention.

The hardware configuration of the MFP 100 is described below. The same goes for the MFP 200. FIG. 3 is a block diagram illustrating the hardware configuration of the MFP in this embodiment. As illustrated in FIG. 3, the MFP 100 includes a main unit 10 that can implement various functions such as a copy function, scan function, facsimile function, and a print function etc. and an operation unit 20 that accepts various inputs by user operation.

Here, a concept of accepting various inputs by user operation includes an operation of accepting information (including signals indicating coordinate values on a screen) input in accordance with user operation. The main unit 10 is communicably connected to the operation unit 20 via a dedicated communication path 40. A communication path compatible with Universal Serial Bus (USB) standard can be used as an example of the communication path 40. In addition, any wireless and wired communication path can be used as the communication path 40.

It should be noted that main unit 10 may perform an operation in accordance with the input by user operation that the operation unit 20 accepts. In addition, the main unit 10 may communicate with the external apparatus such as the file server 300 and perform an operation in accordance with a command received from the external apparatus.

The hardware configuration of the main unit 10 is described below. As illustrated in FIG. 3, the main unit 10 includes a CPU 11, a ROM 12, a RAM 13, a HDD 14, a communication I/F 15, a connection I/F 16, and an engine 17 communicably connected with each other via a system bus 18.

The CPU 11 controls an across-the-board operation of the main unit 10 and corresponds to a first CPU. The CPU 11 controls the entire main unit 10 by executing a program stored in the ROM 12 and the HDD 14 etc. using the RAM 13 as a work area and implements various functions such as the copy function, scan function, facsimile function, and print function etc. described above.

The communication I/F 15 is an interface for connecting to the network 30. The connection I/F 16 is an interface for communicating with the operation unit 20 via the communication path 40.

The engine 17 is hardware that performs operations other than generic information processing and communication for implementing the copy function, scan function, facsimile function, and print function. For example, the engine 17 includes a scanner that scans an image on a document (an image scanning unit), a printer that prints an image on a recording medium such as pater etc. (an image forming unit), and a facsimile that performs facsimile communication. In addition, the engine 17 may include a specific option such as a finisher that sorts printed recording media and an automatic document feeder (ADF) that feeds documents automatically.

The hardware configuration of the operation unit 20 is described below. As illustrated in FIG. 3, the operation unit 20 includes a CPU 21, a ROM 22, a RAM 23, a flash memory 24, a communication I/F 25, a connection I/F 26, an control panel 27, and an external connection I/F 28 communicably connected with each other via a system bus 29.

The CPU 21 controls an across-the-board operation of the operation unit 20 and corresponds to a second CPU. The CPU 21 control the entire operation unit 20 by executing a program stored in the ROM 22 and the flash memory 24 etc. using the RAM 23 as a work area and implements various functions such as displaying information (image) in accordance with accepted input by user operation described later etc.

The communication I/F 25 is an interface for connecting to the network 30. The connection I/F 26 is an interface for communicating with the main unit 10 via the communication path 40. The external connection I/F 28 is an interface for connecting to an IC card reader etc.

The control panel 27 accepts various inputs in accordance with user operation and displays various information such as information in accordance with the accepted input by user operation and various screens etc. In this embodiment, the control panel 27 is implemented by using a LCD that supports a touch panel function. However, the configuration of the control panel 27 is not limited to that example. For example, the control panel 27 may be implemented by using an organic EL display device that supports the touch panel function. Furthermore, in addition to the configuration or instead of the configuration, it is possible to include an input device such as a hardware key etc. and a display unit such as a lamp etc. It should be noted that the control panel 27 is an example of the display unit.

In addition, in this embodiment, to maintain independence of function, software installed in the main unit 10 is different from software installed in operation unit 20. That is, the main unit 10 operates independently from the operation unit 20 running on separate operating systems (OSs). That is, it is possible to use Linux® as the software in main unit 10 and use Android® as the software in the operation unit 20. The OS in the main unit 10 is an example of a first OS, and the OS in the operation unit 20 is an example of a second OS.

As described above, in the MFP 100 in this embodiment, the main unit 10 operates on the OS separate from the operation unit 20. Therefore, communication between the main unit 10 and the operation unit 20 is performed not as interprocess communication within a common apparatus but as communication between different apparatuses. An operation of passing information (content of command input by user operation) accepted by the operation unit 20 to the main unit 10 (i.e., command communication) and an operation that the main unit 10 reports an event to the operation unit 20 correspond to the communication between different apparatuses.

In this case, it is possible to use the function in the main unit 10 by performing command communication from the operation unit 20 to the main unit 10. Examples of the event reported to the operation unit 20 from the main unit 10 are an execution status of an operation in the main unit and a setting value configured by the main unit 10.

Figure 4:
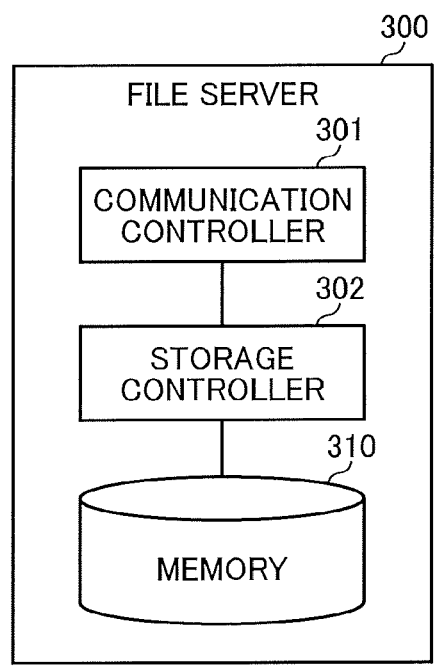
FIG. 4 is a block diagram illustrating functions of the file server as an example embodiment of the present invention.

The functional configuration of the file server 300 is described below. FIG. 4 is a block diagram illustrating functions of the file server in this embodiment. As illustrated in FIG. 4, the file server 300 includes a communication controller 301, a storage controller 302, and a memory 310 connected with each other.

Various information and screens are stored in the memory, and the memory may be implemented by using the ROM 602 and the HDD 604 illustrated in FIG. 2. In this embodiment, the memory 310 stores a print file such as an image and document etc. The print file is a file such as image data and a document etc. In the example of the store and the headquarters described above, the print file is information provided to customers such as an advertisement and notification created by using an image and document.

The memory 310 stores the print file associated with file identification information for identifying the print file. More specifically, for example, in the memory 310 in this embodiment, a print file is stored attaching a specific file name for identifying the print file (i.e., as an example of the file identification information) to the print file. Furthermore, in the memory 310, related multiple print files are stored in a folder with a folder name in a lump sum. A specific folder name for identifying the folder is allocated to the folder.

The communication controller 301 controls communication between the external apparatus such as the MFPs 100 and 200 connected via the network 30 performed by the communication I/F 606 illustrated in FIG. 2. For example, the communication controller 301 in this embodiment receives a request from the MFPs 100 and 200 and transfers information in accordance with the request to the MFPs 100 and 200.

More specifically, for example, in case of receiving a request for a list of names of folder that stores multiple print files from the MFPs 100 and 200, the communication controller 301 refers to the memory 310 and transfers the list of folder names to the MFPs 100 and 200.

In addition, in case of receiving a folder name of the root folder and a request for a list of names of print file and update date/time of a print name indicated by the file names from the MFPs 100 and 200, the communication controller 301 refers to the memory 310 and transfers the list of names of print files stored in the folder indicated by the received name of the root folder and update date/time to the MFPs 100 and 200.

In case of receiving a request for a print file from the MFPs 100 and 200, the communication controller 301 refers to the memory 310 and transfers the requested print file to the MFPs 100 and 200.

In this case, in receiving the request for various information and transferring information in accordance with the received request (requesting information and transferring information), the file server 300 performs an authentication operation that determines whether or not the user has authority to acquire various information via the MFPs 100 and 200. As a result, in requesting information and transferring information between the MFPs 100 and 200, first, the communication controller 301 transfers a request for authentication information to the MFPs 100 and 200 that transfers the request for information and receives authentication information input by user operation from the MFPs 100 and 200. Subsequently, the file server 300 performs the authentication operation using the received authentication information and transfers the requested information if the authentication succeeds. The authentication information is information that may identify a user such as user ID and password etc.

In the authentication operation in this embodiment, for example, after receiving the requested authentication information from the MFPs 100 and 200, the received authentication information is compared with authentication information preregistered in the file server 300 (authentication information of a user who has authority to acquire information). Subsequently, if the received authentication information corresponds to the registered authentication information, it is determined that the user has authority to acquire the information. By contrast, if the received authentication information does not correspond to the registered authentication information, it is determined that the user does not have authority to acquire the information. After that, the determination result is transferred to the MFPs 100 and 200.

The storage controller 302 stores, updates, and deletes various information in the memory 310. In this embodiment, for example, the storage controller 302 stores, updates, and deletes a print file etc. received from the external apparatus in the memory 310.

Figure 5:
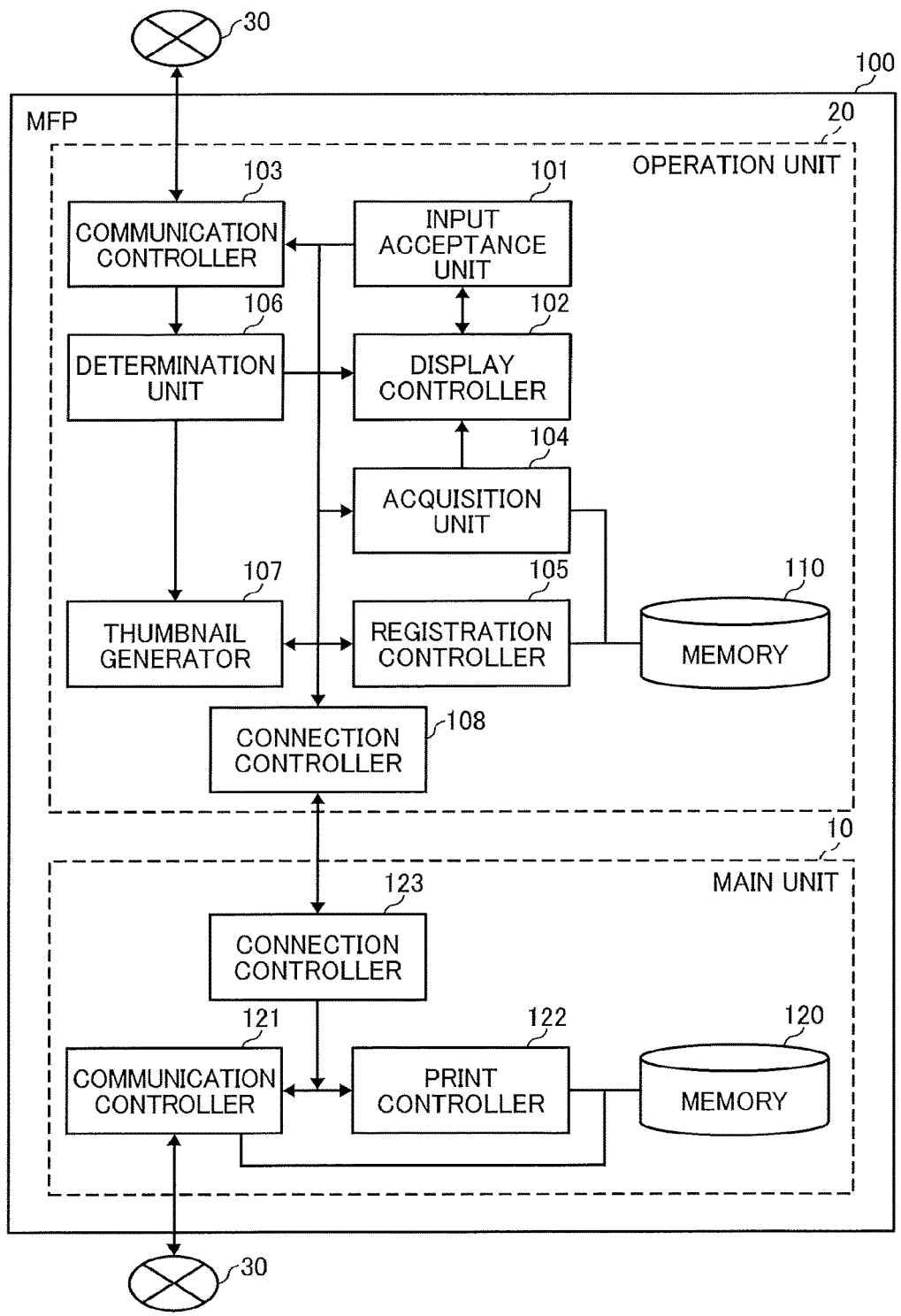
FIG. 5 is a block diagram illustrating functions of the MFP as an example embodiment of the present invention.

Next, a functional configuration of the MFP 100 is described below. Since the same goes for the MFP 200, so the description of the configuration of the MFP 200 is omitted. FIG. 5 is a block diagram illustrating functions of the MFP in this embodiment. As illustrated in FIG. 5, the operation unit 20 of the MFP 100 includes an input acceptance unit 101, a display controller 102, a communication controller 103, an acquisition unit 104, an registration controller 105, a determination unit (determining unit) 106, a thumbnail generator 107, a connection controller 108, and a memory 110, and related functions are connected with each other. The main unit of the MFP 100 includes a communication controller 121, a print controller 122, a connection controller 123, and a memory 120, and related functions are connected with each other. In addition, the operation unit 20 is connected to the main unit 10 via the connection controller 108 and the connection controller 123. The connection controller 108 may be implemented by the connection I/F 26 in FIG. 3, and the connection controller 123 may be implemented by web API as the connection I/F 16.

Here, in the MFP 100 in this embodiment, the main unit 10 and the operation unit 20 are included in the same apparatus. However, the main unit 10 and the operation unit 20 may be included in multiple apparatuses. That is, it is possible that the main apparatus (main unit) and the operation apparatus (operation unit) are included in the same apparatus as described in this embodiment. Otherwise, the operation apparatus may be an apparatus separated from the main apparatus such as a tablet device etc.

The memory 110 is included in the operation unit 20, and various information and screens are registered in the memory 110. The memory 110 may be implemented using the ROM 22 and the flash memory 24 illustrated in FIG. 3. In this embodiment, for example, information that constructs various screens and not-printed-yet information indicating that the print file has not been output (e.g., printed) yet (with reference to badges P1a and P5a in FIG. 11 described later in detail) are registered in the memory 110.

The memory 120 that registers various information and screens etc. is included in the main unit 10 and can be implemented by using the HDD 14 (illustrated in FIG. 3). In this embodiment, server information as information on the file server 300, printed information that name of a printed print file is registered, a thumbnail generated from a print file, and cache management information for managing information on a registered thumbnail are registered in the memory 120.

Here, the server information is information required when the MFP 100 accesses the file server 300. For example, an address of the file server (such as an IP address etc.), authentication information (i.e., user ID and password), and a folder name of the root folder are registered in the server information. In this embodiment, only the server information of the file server 300 is registered. However, if multiple file servers are connected, it is possible to register server information of all connected servers.

In addition, in the printed information, information that can identify a print file that has already been printed by the MEP 100 is registered. The printed information is used for determining whether or not the print file has already been printed as an example of output information. FIG. 6 is a diagram illustrating finished print information registered in a memory in the MFP in this embodiment. As illustrated in FIG. 6, for example, print date/time of a print file, a file name of the print file, and update date/time of the print file are included in the printed information registered associated with each other. For example, the printed information is registered when the print file is printed.

"Print date/time" indicates date/time when the print file is printed. In FIG. 6, for example, the print date/time is registered as "2016/03/24 12:00:00" indicating that the print file is printed at 12:00:00 on Mar. 24, 2016. For example, if a size of the printed information becomes larger than a predetermined size, the print date/time can be used for deleting a registered print file whose print date/time is the oldest in sequence etc.

Here, the configuration that deletes the registered print file whose print date/time is older if the size of the printed information becomes larger than the predetermined size is described above. Other than that, if a print file is deleted from the file server 300, it is possible to delete a registered print file whose printed information is corresponding. In this case, for example, the MFP 100 acquires a list of file names regularly from the file server 300 and check the acquired list of file names and the printed information. Subsequently, if the file name registered in the printed information does not exist in the acquired list of file names, it is determined that the print file indicated by the file name has already been deleted, and the file name is deleted from the printed information.

"The file name of the print file" is a file name that can identify the printed print file. In this embodiment, the file name of the print file is location information indicating a location of the print file in the file server 300. More specifically, for example, the file name of the print file is a full path of the printed print file. In FIG. 6, the file name of the print file is registered as "¥¥192.168.0.1¥SharedFiles¥POPFiles¥FlyerA.pdf". The full path is a notation of a string (path) that indicates a location of a file or folder and information that describes a full path from the top layer as a top of a hierarchy structure (in this case, an address of the file server 300) to the target print file without omission. As described above, by registering the full path of the print file in the printed information, it is possible to distinguish the print file from a print file whose file name is the same stored in another folder or another file server.

"Update date/time of print file" is date/time when a creator of the print file modifies the print file lastly. If the print file is not modified, update date/time of print file indicates date/time when the print file was created. In FIG. 6, for example, the update date/time is registered as "2016/02/25 13:00:05" indicating that the print file was updated at 13:00:05 on Feb. 25, 2016. The update date/time of the print file is registered in the file server 300 standardly. By using the update date/time of the print file for determining whether or not the print file has already been printed, if the creator of the print file reedits (modifies) the print file that has already been printed, it is possible to prompt a user to print the print file as a print file that has not been printed yet.

In the printed information in this embodiment, print date/time, the file name of the print file, and update date/time of the print file are registered as file identification information of the print file. However, no limitation is intended thereby. That is, whatever information that can identify a print file can be used. For example, a file size of the print file etc. can also be used.

The cache management information is information on a thumbnail of the print file registered in the MFP 100, and the cache management information is used for determining whether or not the thumbnail of the print file is registered. FIG. 7 is a diagram illustrating cache management information registered in the memory 120 in the MFP in this embodiment. As illustrated in FIG. 7, in the cache management information, for example, the file name of the print file, generation date/time when the thumbnail was generated, and registration location where the thumbnail is registered are registered associated with each other.

In FIG. 7, for example, the file name of the print file "¥¥192,168.0.1¥SharedFiles¥POPsample¥Sale.pdf", generation date/time of the thumbnail "2016/02/27 12:00:00", and registration location of the thumbnail "Cache¥1231248yt3.jpg" are registered associated with each other. As a result, it is determined that the thumbnail whose file name is "¥¥192,168.0.1¥SharedFiles¥POPsample¥Sale.pdf" is generated at 12:00:30 on Feb. 27, 2016 and registered in "Cache¥1231248yt3.jpg" in the memory 120.

Next, functions of the main unit 10 in the MFP 100 are described below. The communication controller 121 exchanges various information and screens etc. with the external apparatus such as the file server 300 via the network 30 using the communication I/F 15. The connection controller 123 exchanges various information and screens etc. with the operation unit 20 using the connection I/F 16.

The print controller 122 prints out the print file specified by user operation using the engine 17 and is implemented by using a print application that performs print out of the print file. The print controller 122 is an example of an output controller.

Next, functions of the operation unit 20 in the MFP 100 are described below. The input acceptance unit 101 performs control that accepts various input by user operation from the control panel 27. More specifically, the input acceptance unit 101 accepts input of starting up the print application 50 that prints out the print file. In addition, the input acceptance unit 101 accepts inputting an address (such as IP address etc.) for specifying the file server intended to be connected from the server address input screen (as an example of the input screen). The input acceptance unit 101 also accepts inputting authentication information from the authentication information input screen. In addition, the input acceptance unit 101 accepts selecting a folder in the lower layer to enter into and selecting a folder to be registered as the root folder.

The input acceptance unit 101 also accepts specifying the print file intended to be printed, requesting to print the print file (as an example of the output request), and print settings (as an example of output settings). The input acceptance unit 101 also accepts request for redisplay indicating that the print file list display screen is redisplayed in case of redisplaying the print file list display screen. The details of the various screens are described later.

The display controller 102 displays various screens such as a configuration screen etc. and various information on the control panel 27. More specifically, the display controller 102 displays a server address input screen for inputting an address of the file server intended to be connected. FIG. 8 is a diagram illustrating a server address input screen in this embodiment. As illustrated in FIG. 8, in a server address input screen D1, text that prompts a user to input the address of the file server is displayed, and an input area a for inputting the address of the file server (that is, computer name or IP address) is displayed. A cursor is moved into the input area a, and the address of the file server 300 is input by user operation.

In addition, the display controller 102 displays an authentication information input screen for inputting the authentication information. FIG. 9 is a diagram illustrating an authentication information input screen in this embodiment. As illustrated in FIG. 9, in a authentication information input screen D2, text that prompts a user to input user ID and password as the authentication information is displayed, and an input area b for inputting the user ID, an input area c for inputting the password, a "back" button d for returning to the previous screen, and a "next" button e for proceeding the operation are displayed. The authentication information is input by inputting user ID and password in the input areas b and c respectively by user operation.

Figure 10:
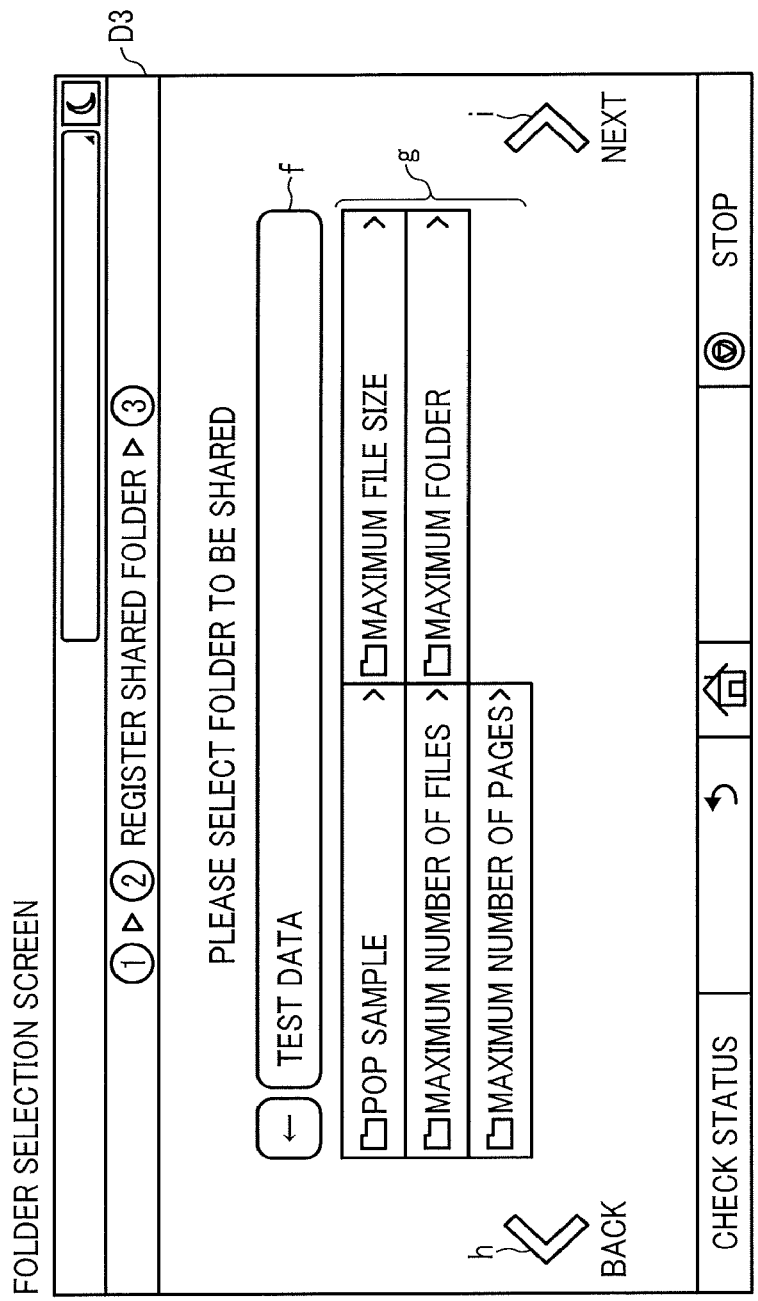
FIG. 10 is a diagram illustrating a folder selection screen as an example embodiment of the present invention.

The display controller 102 also displays a folder selection screen for selecting a folder. FIG. 10 is a diagram illustrating a folder selection screen in this embodiment. As illustrated in FIG. 10, in a folder selection screen D3, text that prompts a user to select a folder is displayed, a display area f that displays a selected folder and multiple folders g that displays selectable multiple folders are displayed in the center of the screen, and a "back" button h for returning to the previous screen and "next" button I for proceeding the operation are also displayed on the screen. After pressing any folder among the multiple folders g for a while by user operation, folders in the lower layer are displayed. After selecting any folder among the folders, it is possible to move to the lower layer. After selecting any folder by pressing the folder among multiple folders g by user operation, the selected folder is displayed in the display area f Subsequently, after pressing "next" button i, the selected folder is determined as the root folder and registered.

Figure 11:
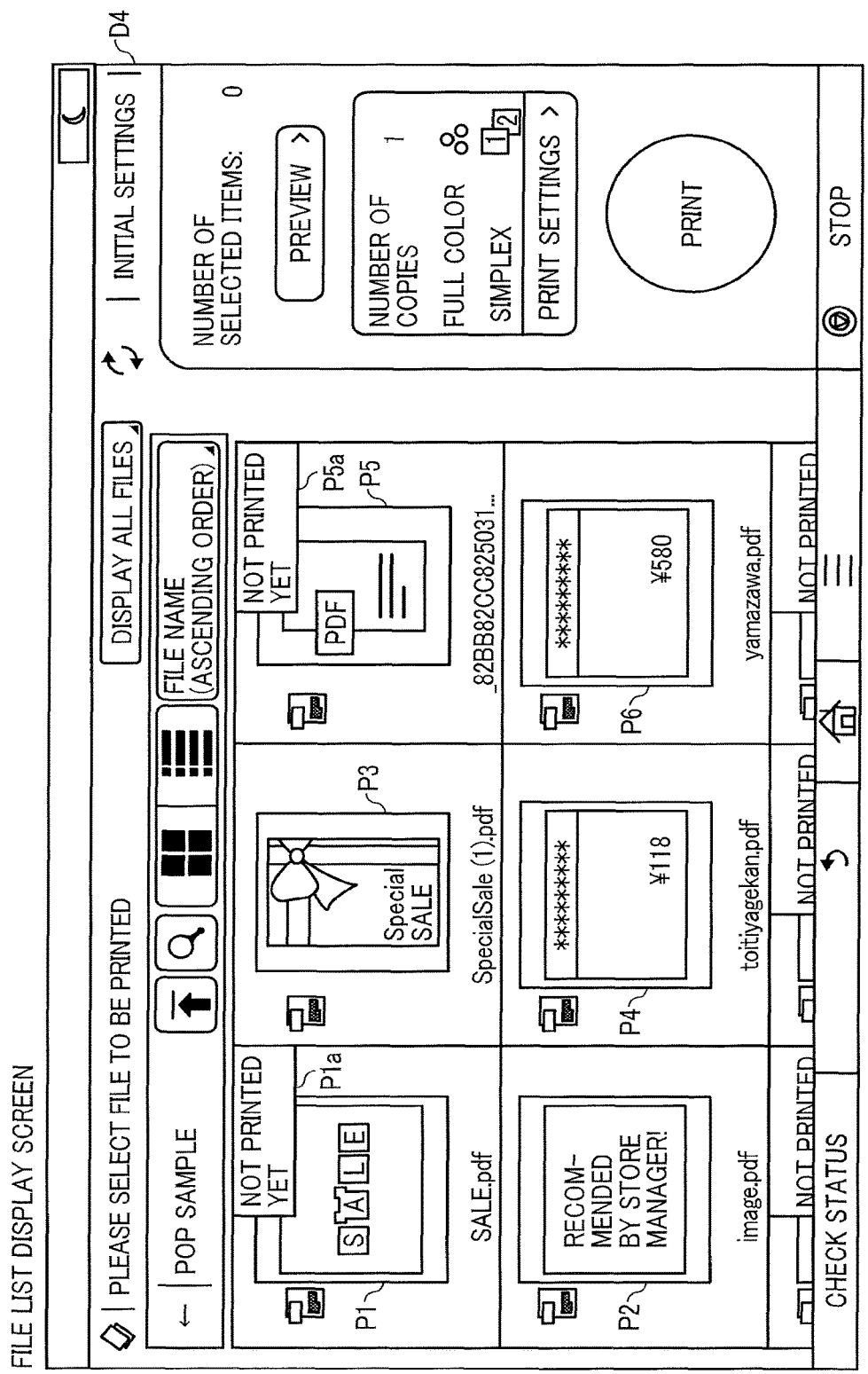
FIG. 11 is a diagram illustrating a file list display screen as an example embodiment of the present invention.

In addition, the display controller 102 displays a file list display screen for specifying the print file. FIG. 11 is a diagram illustrating a file list display screen in this embodiment. As illustrated in FIG. 11, in a file list display screen D4, thumbnails P1 to P6 of print files are displayed. On the thumbnails P1 and P5 for the print files that have not been printed yet, badges P1a and P5a (as an example of not-output-yet information) indicating that the print files have not been printed yet are attached and displayed on the upper right of the thumbnails respectively. As a result, it is possible to specify the print file that has not been printed yet, and it is possible for a user to recognize that the print files indicated by the thumbnails P1 and P5 have not been printed yet. Subsequently, after specifying the print file that the badge as the not-output-yet information is attached by user operation, it is possible to print out the print file that has not been printed yet. On the badges P1a and P5a in FIG. 11, text "not printed yet" is displayed. However, any display that a user can recognize that the print file has not been printed yet can be used. In addition, on the file list display screen D4, a list of thumbnails of print files is displayed, and that corresponds to a list of print files as an example of a screen selecting a print file. Cases of timing when the file list display screen is displayed are accepting launch of the print application 50, accepting input of requesting to redisplay the print file list display screen, and printing the print file.

For example, the communication controller 103 exchanges various information with mobile terminals such as a smartphone and a tablet device etc. using the communication I/F 25. The connection controller 108 exchanges various information and screens etc. with the main unit 10 using the connection I/F 26. As a result, the connection controller 108 receives various information received from the external apparatus such as the file server 300 using the communication controller 121 via the connection controller 123 in the main unit 10 and transfers various information to the external apparatus such as the file server 300.

The acquisition unit 104 acquires intended information from the memory 120. More specifically, for example, in order to connect to the file server 300 to display the file list display screen, the acquisition unit 104 searches for the server information of the file server 300 through the memory 120 and acquires the server information. In addition, in determining whether or not the print file has not been printed yet using the determination unit 106, the acquisition unit 104 acquires the printed information from the memory 120. In displaying the file list display screen, if the thumbnail is registered in the memory 120, the acquisition unit 104 also acquires the thumbnail. If there is the print file that has not been printed yet, the acquisition unit 104 acquires not-output-yet information from the memory 110.

The registration controller 105 controls registering information in the memory 120. More specifically, the registration controller 105 registers the address of the file server 300 input by user operation (such as IP address etc.), authentication information (user ID and password etc.), and folder name of the root folder selected on the folder selection screen in the memory 120. In addition, in printing the print file, the registration controller 105 registers printed information associating the file name of the printed print file, update date/time, and print date/time with each other in the memory 120.

By using the printed information registered in the memory 120, the determination unit 106 determines whether or not the print file has not been printed yet. More specifically, the determination unit 106 compares the list of file names and update date/time received from the file server 300 with file names and update date/time in the printed information. Subsequently, among the received file names and update date/time, a print file whose at least either one of file name and update date/time does not correspond to the file names and update date/time in the printed information is determined as not-printed-yet. The determination method using a specific example is described later. After that, the not-output-yet information (e.g., the badge indicating that the print file has not been printed yet) is attached to the thumbnail of the print file determined as not-printed-yet and the thumbnail is displayed on the file list display screen.

In addition, in displaying the file list display screen, the determination unit 106 determines whether or not a thumbnail of a print file intended to be displayed is registered in the cache management information registered in the memory 120.

The thumbnail generator 107 reduces the print file to generate the thumbnail. The thumbnail is image data that reduces the print file from its original size to display a list of a large number of images and documents. In this embodiment, if the thumbnail of the print file intended to be printed is not registered in the cache management information registered in the memory 120, the thumbnail generator 107 generates the thumbnail. More specifically, after receiving the print file from the file server 300 by using the communication controller 121, the thumbnail generator 107 acquires the print file via the connection controller 108 and the connection controller 123 and reduces the acquired print file to generate the thumbnail.

Figure 12:
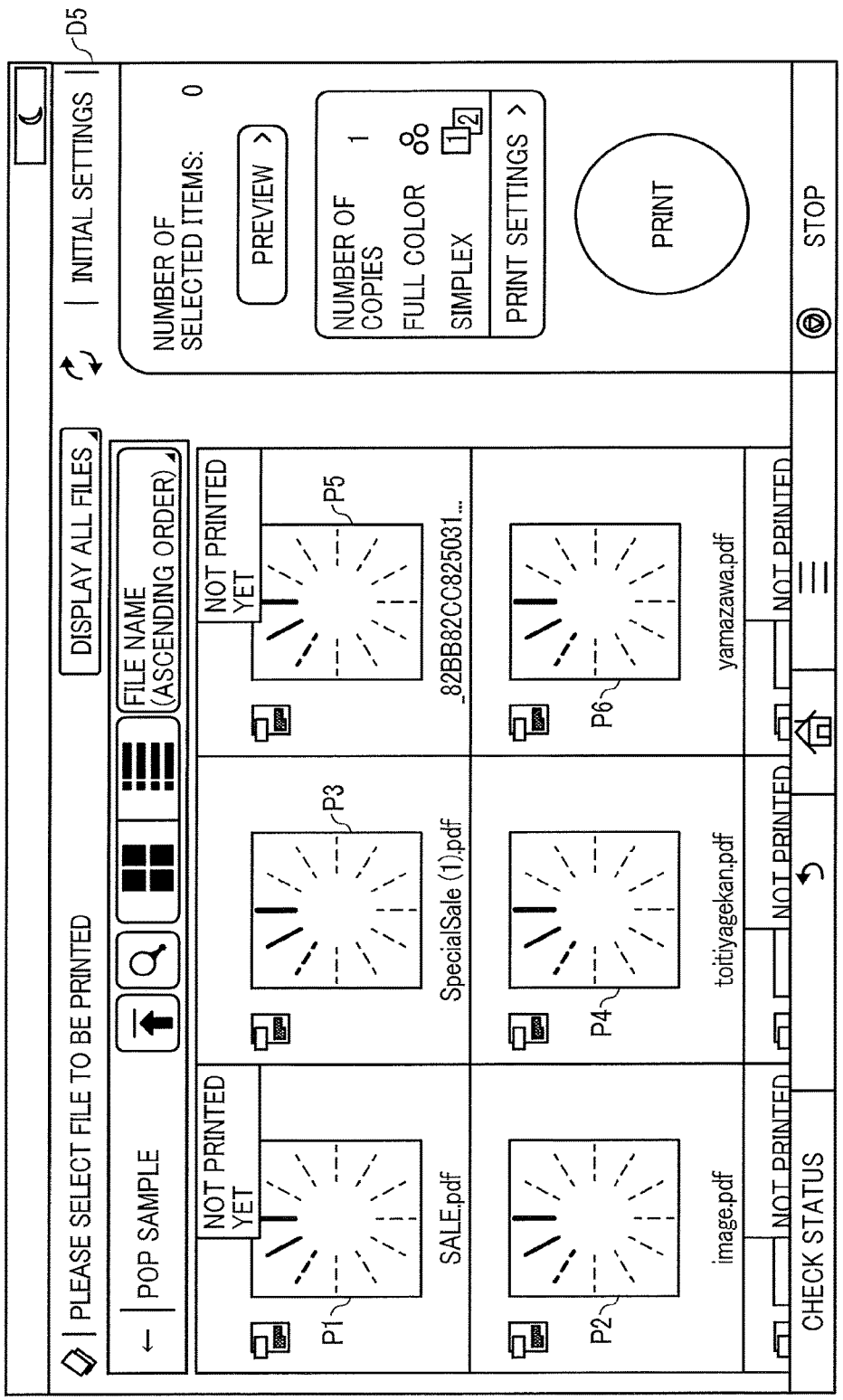
FIG. 12 is a diagram illustrating a file list display screen that a thumbnail image is not displayed as an example embodiment of the present invention.
Figure 13:
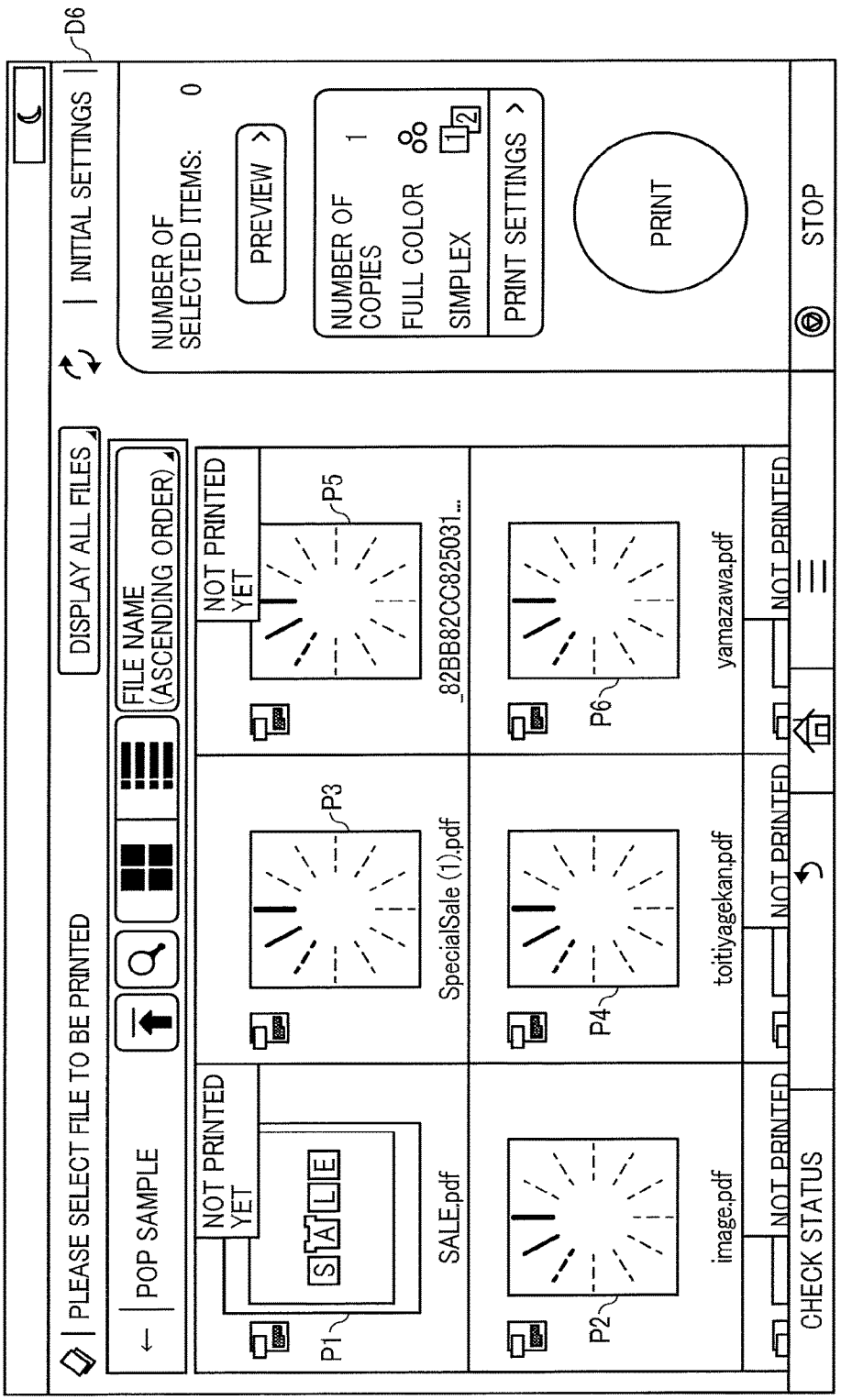
FIG. 13 is a diagram illustrating a file list display screen that a first thumbnail image is displayed as an example embodiment of the present invention.

An operation of acquiring or generating the thumbnail and displaying the file list display screen is described below with reference to screens. FIG. 12 is a diagram illustrating a file list display screen that a thumbnail image is not displayed in this embodiment. FIG. 13 is a diagram illustrating a file list display screen that a first thumbnail image is displayed in this embodiment.

First, in an initial state of displaying a thumbnail on the file list display screen, the display controller 102 displays a file list display screen D5 that all thumbnails are not displayed making thumbnails of all print files icons waiting for reading in as illustrated in FIG. 12.

The cache management information that registers information on a thumbnail is registered in the memory 120 as illustrated in FIG. 7. With reference to FIGS. 7 and 12, in case of displaying a thumbnail of a print file for "Sale.pdf", first, the determination unit 106 searches through the cache management information (illustrated in FIG. 7) and checks whether or not information on the thumbnail P1 "Sale.pdf" exists in the cache management information. After performing the search, since it is determined that the information exists in the cache management information, the determination unit 106 compares the last update date/time of the print file for "Sale.pdf" with date/time when the thumbnail was generated.

After performing the comparison, if it is determined that the date/time when the thumbnail was generated is newer, the determination unit 106 determines that the cache data (i.e., the thumbnail) exists. By contrast, if the last update date/time of the print file is newer, since it is possible that the print file in the file server 300 is updated (modified) after the thumbnail cached in the MFP 100 is generated, the determination unit 106 determines that the cache data (thumbnail) does not exist.

If it is determined that the cache data exists, the thumbnail of the print file for "Sale.pdf" is acquired from the memory 120 and displayed on the file list display screen D6 as illustrated in FIG. 13. By contrast, if it is determined that the cache data does not exist, the print file for "Sale.pdf" is acquired via the communication controller 121, and the thumbnail generator 107 generates a thumbnail newly from the acquired print file. Subsequently, the generated thumbnail is displayed on the file list display screen D6 as illustrated in FIG. 13. After registering the generated thumbnail as cache data in the memory 120 where the thumbnail cache is registered, the registration controller 105 registers information on the generated thumbnail (i.e., the file name of the print file, date/time when the thumbnail was generated, and the location where the thumbnail is registered) in the cache management information illustrated in FIG. 7.

In adding the thumbnail, if the total size of the thumbnail exceeds a predetermined size, the registration controller 105 deletes the thumbnail whose generated date/time is older in chronological order. As described above, it is controlled that the registered thumbnail does not exceed the predetermined size. As a result, it is possible to prevent the memory 120 in the MFP 100 from being over-weighed unnecessarily.

Figure 14:
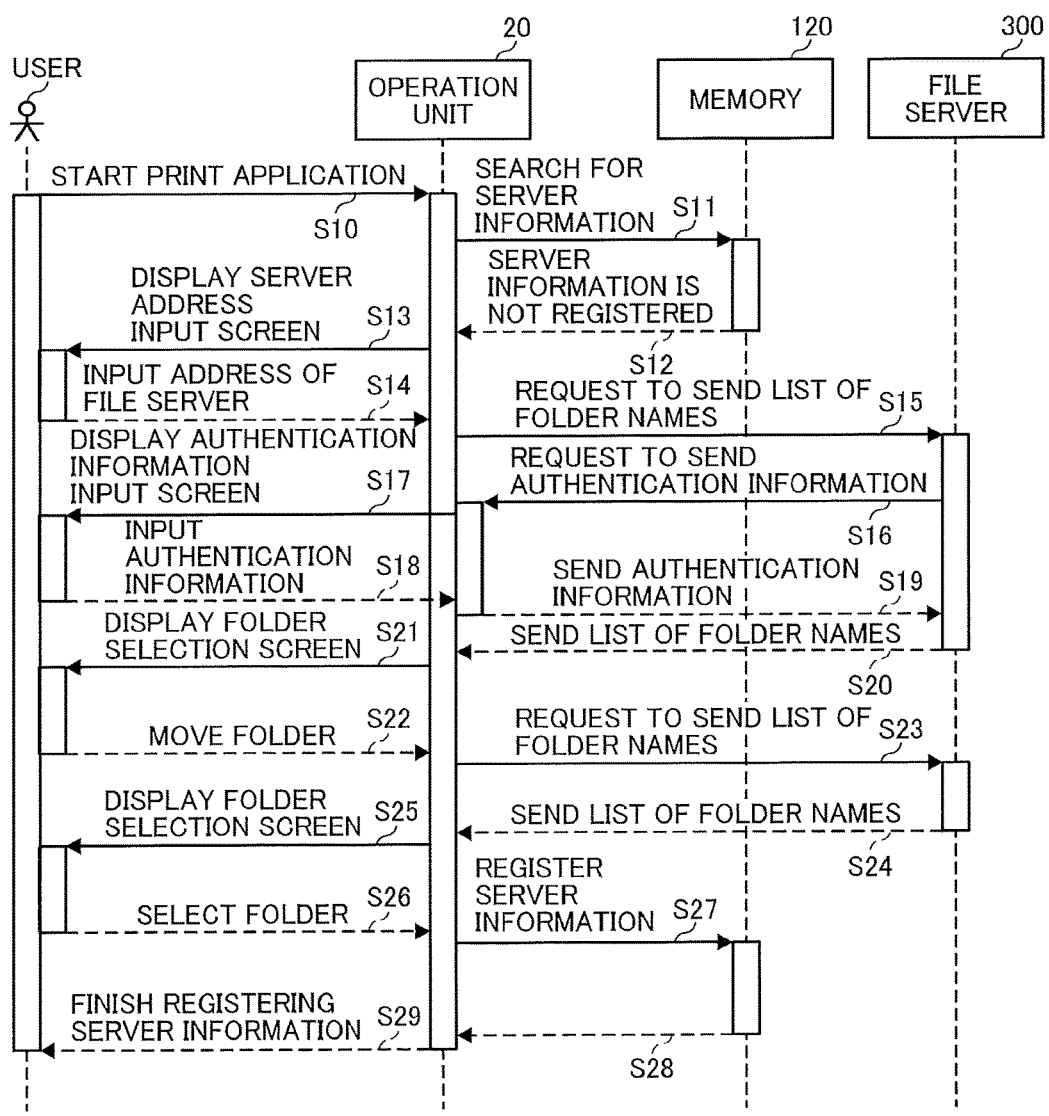
FIG. 14 is a sequence chart illustrating an operation of registering server information of the file server for the MFP as an example embodiment of the present invention.

Next, an operation of registering server information of the file server 300 connected to the MFP 100 in the MFP 100 is described below. In the below description, the operation performed in the MFP 100 is described. However, the same goes for the MFP 200. FIG. 14 is a sequence chart illustrating an operation of registering server information of the file server for the MFP in this embodiment.

First, after receiving a request to launch the print application 50 by user operation in S10, the operation unit 20 searches through the memory 120 to check whether or not the server information exists in S11. If the MFP 100 starts up for the first time, the MFP 100 has never been connected to the file server 300 before. Therefore, the server information has not been registered yet in S12.

As a result, the operation unit 20 displays the server address input screen illustrated in FIG. 8 in S13 to prompt the user to input the address of the file server to be used. Subsequently, the operation unit 20 accepts inputting the address of the file server by user operation from the server address input screen in S14. Here, a case that the address of the file server 300 is input is described below. As a result, for example, IP address of the file server 300 is input into the input area a in the server address input screen D1 illustrated in FIG. 8 by user operation.

Next, in case of accepting inputting a request to transition the screen by pressing a screen transition button (i.e., the "next" button k in FIG. 8), the operation unit 20 transfers a command to request folder information (i.e., a command to request the list of folder names) to request the file server 300 to send the list of folder names in S15. In response, the file server 300 sends a request to transfer authentication information using SMB protocol in S16. After requesting the list of folder names, it is possible that the file server 300 replies by transferring the list of folder names.

After receiving the request, the operation unit 20 displays the authentication information input screen illustrated in FIG. 9 in S17 and prompts the user to input the authentication information. Subsequently, the operation unit 20 accepts inputting the authentication information by user operation from the authentication information input screen in S18 and transfers the accepted authentication information to the file server 300 in S19. For example, a user ID is input into the input area b and password is input into the input area c in the authentication information input screen D2 illustrated in FIG. 9 by user operation.

In the file server 300, if it is succeed to authenticate the user, the file server 300 transfers the list of folder names to the operation unit 20 in S20. After receiving the list of folder names, the operation unit 20 displays the folder selection screen illustrated in FIG. 10 using the folder names in S21 to prompt the user to select the root folder.

If needed, in case of moving to a folder in the lower layer of the folder name displayed on the folder selection screen, a request to move to the folder by user operation is accepted in S22. In that case, the operation unit 20 requests the file server 300 to send the list of folder names in the lower layer along with the selected folder name in S23, and the file server 300 transfers the list of folder names in the lower layer to the operation unit 20 in S24. After receiving the list of folder names, the operation unit 20 displays the folder selection screen illustrated in FIG. 10 using the folder names in S25 to prompt the user to select the root folder.

In case of not moving to the folder in the lower layer, the operation in S22 to S25 is not performed. In case of moving to a folder in the further lower layer, the operation in S22 to S25 is repeated.

Next, the operation unit 20 accepts selecting the folder to be registered as the root folder by user operation from the folder selection screen in FIG. 10 in S26. For example, the folder is selected by pressing any one folder among folders g in the folder selection screen D3 in FIG. 10. The operation unit 20 registers the server information required in connecting to the file server 300 next time (i.e., address, authentication information, and root folder) in the memory 120 regarding the selected folder as the root folder in steps S27 and S28. Subsequently, the operation unit 20 displays that it is finished to register the server information in S29. As a result, the user recognizes that it is possible to connect to the file server 300.

Figure 15:
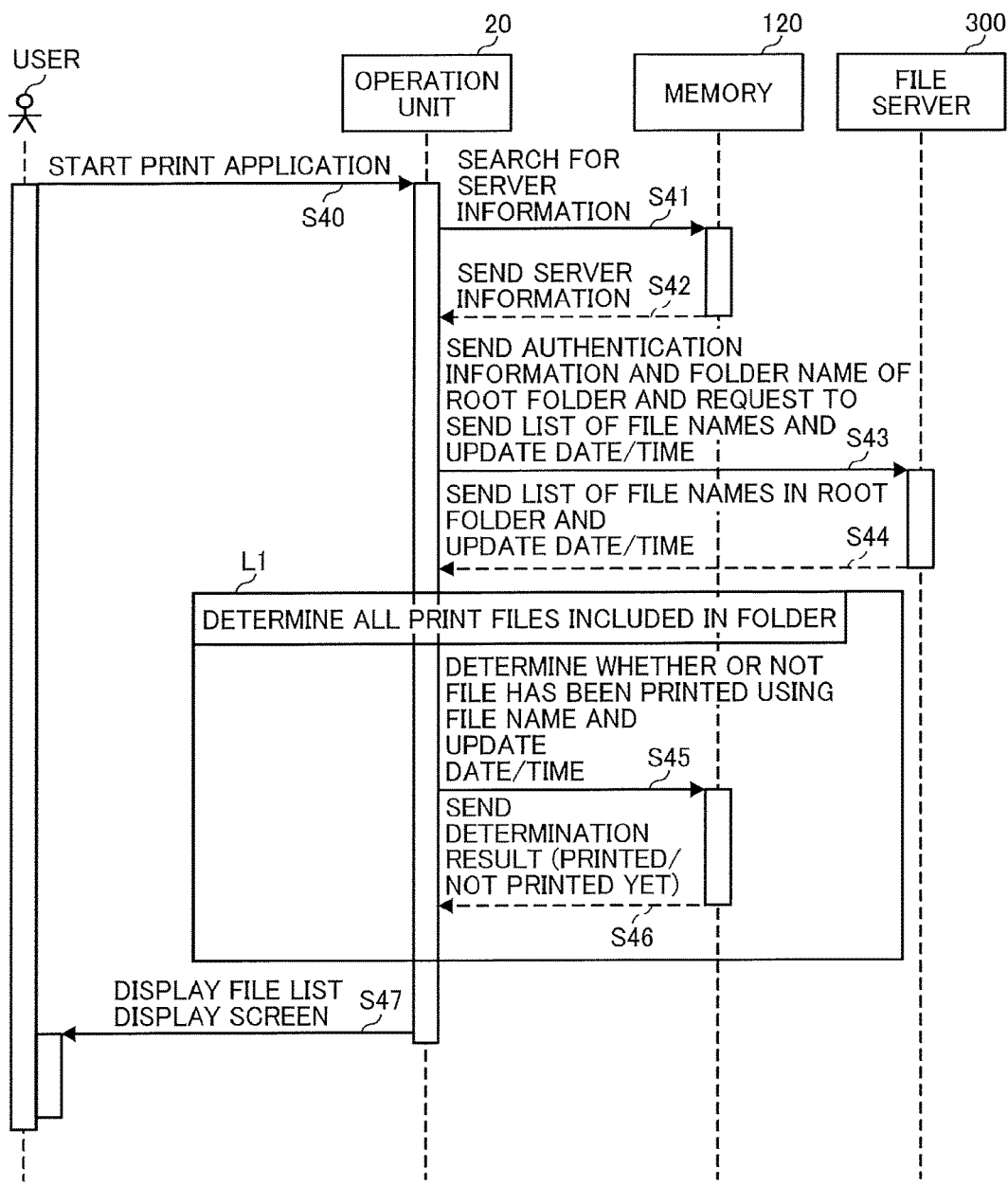
FIG. 15 is a sequence chart illustrating an operation of displaying a list of print files for the MFP as an example embodiment of the present invention.

Next, an operation of displaying a list of print files stored in the file server 300 on the MFP 100 is described below. FIG. 15 is a sequence chart illustrating an operation of displaying a list of print files for the MFP in this embodiment.

First, after receiving a request to launch the print application 50 by user operation in S40, the operation unit 20 searches through the memory 120 to check whether or not the server information is stored in S41 and acquires the registered server information of the file server 300 in S42.

The operation unit 20 access the file server 300 using the address in the acquired server information, transfers the authentication information and the folder name of the root folder, and requests to send the list of folder names and date/time when the file was updated in S43.

Here, the operation that the MFP 100 transfers the authentication information and the folder name of the root folder to the file server 300 and requests to send the list of file names and update date/time is described below specifically with reference to FIG. 16. FIG. 16 is a diagram illustrating an operation of sending the authentication information and the folder name of the root folder that the MFP transfers to the file server and requesting the list of file names and update date/time in this embodiment. As illustrated in FIG. 16, example items of information transferred to the file server 300 are command, folder name of root folder, and user ID and password as authentication information. Accordingly, in FIG. 16, specific contents corresponding to each item are illustrated. That is, the MFP 100 transfers a command to "acquire the list of file names and update date/time", a full path "¥¥192.168.0.1¥SharedFiles¥POPFiles" as the folder name of the root folder, user name "user B" as the authentication information, and password "password" as the authentication information to the file server 300.

Now, back to FIG. 15, the operation unit 20 receives the list of file names for print files stored in the root folder and their update date/time in S44.

Here, the list of file names and update date/time that the MFP 100 receives from the file server 300 (i.e., as a response to the information in FIG. 16) is described below specifically with reference to FIGS. 17 and 18. FIG. 17 is a diagram illustrating the list of file names and update date/time that the MFP receives from the file server in this embodiment. As illustrated in FIG. 17, example items of information received from the file server 300 are type, name, access authority information, owner, create date/time, last update date/time, and size. Accordingly, in FIG. 17, specific contents corresponding to each item are illustrated.

That is, "type" is in flag type and indicates whether either a folder or a print file. "Name" is a data format in string type and indicates a file name of the print file or a folder name of a folder where the print file is stored. In FIG. 17, it is assumed that the type is print file and the name of the print file is "¥¥192.168.0.1¥SharedFiles¥POPFiles¥FlyerA.pdf". "Access authority information" is in flag type and indicates either one of read/write, read only, and inaccessible. "Owner" is in data format of string type and indicates a user who created the print file. In FIG. 17, "owner" indicates "userB". "Create date/time" and "last update date/time" are date format in integer type. In FIG. 17, both "Create date/time" and "last update date/time" indicates "2016/02/25 13:00:05". "Size" is in data format of integer type and indicates 1048576 bytes as the size of the print file in FIG. 17.

In one folder stored in the file server 300, for example, it is possible that multiple folders and print files exist. Therefore, a case that multiple information corresponding to the items in FIG. 17 as a response is transferred from the file server 300 is described below. FIG. 18 is a diagram illustrating the list of file names and update date/time that the file server transfers to the NFP in this embodiment.

If there are multiple folders and print files in the folder stored in the file server 300, as illustrated in FIG. 18, multiple information corresponding to each item (type, name, access authority information, owner, create date/time, last update date/time, and size) are transferred. In FIG. 18, three print files and one folder are stored as an example.

Back to FIG. 15, by comparing the received file name of the print file and update date/time with the printed information registered in the memory 120, the operation unit 20 determines whether or not the print file stored in the root folder has already been printed to determine whether the print file has already been printed or the print file has not been printed yet in S45 and S46. The operation in S45 and S46 is repeated until all print files stored in the folder are determined in L1.

It should be noted that the print application 50 in the operation unit 20 stores the list of file names and update date/time acquired from the file server 300 in the memory (i.e., memory 110) in the operation unit 20 instead of transferring the data to the main unit 10. Subsequently, in order to display the not-output-yet information, the print application 50 invites the printed information to the operation unit 20 to compare the acquired list of file names and update date/time with the printed information. The printed information is stored in the memory 120 in the main unit or the memory 110 in the operation unit 20. If the printed information is stored in the memory 120 in the main unit 10, the print application 50 invites the printed information to the operation unit 20 and performs the comparison.

Here, with reference to FIG. 6 illustrating the printed information and FIG. 18 illustrating the list of file names and update date/time received from the file server 300, an operation of determining whether or not the print file has not been printed yet is described below specifically.

First, the operation unit 20 compares the first print file in FIG. 18 with the printed information in FIG. 6. That is, it is checked whether or not the first name in FIG. 18 (i.e., the file name of the print file) "¥¥192.168.0.1¥SharedFiles¥POPFiles¥FlyerA.pdf" exists in the file names of the print file registered in the printed information by performing the search. After performing the search, since the first name in FIG. 18 corresponds to the first file name of the print file in the printed information, the operation unit 20 determines that the first print file in FIG. 18 exists in the printed information in FIG. 6. Next, the operation unit 20 determines whether or not the last update date/time of the first print file in FIG. 18 corresponds to the update date/time of the first print file in the printed information. After performing the determination, since it is determined that both date/time correspond, the operation unit 20 determines that the first print file in FIG. 18 has already been printed.

Next, the operation unit 20 compares the second print file in FIG. 18 with the printed information in FIG. 6. That is, it is checked whether or not the name of the second print file in FIG. 18 "¥¥192.168.0.1¥SharedFiles¥POPFiles¥FlyerB.pdf" exists in the file names of the print file registered in the printed information by performing the search. After performing the search, since the second name in FIG. 18 corresponds to the second file name of the print file in the printed information, the operation unit 20 determines that the second print file in FIG. 18 exists in the printed information in FIG. 6. Next, just like the case described above, the operation unit 20 determines whether or not the last update date/time of the second print file in FIG. 18 corresponds to the update date/time of the second print file in the printed information. After performing the determination, since it is determined that both date/time do not correspond, the operation unit 20 determines that the second print file in FIG. 18 is modified after being printed and the print file has not been printed yet.

Next, the operation unit 20 compares the third print file in FIG. 18 with the printed information in FIG. 6. That is, it is checked whether or not the name of the third print file in FIG. 18 "¥¥192.168.0.1¥SharedFiles¥POPFiles¥FlyerC.pdf" exists in the file names of the print file registered in the printed information by performing the search. After performing the search, it is determined that the file name does not exist in the printed information, and it is determined that the third print file in FIG. 18 has not been printed yet.

Next, the last (fourth) entry in FIG. 18 is a folder. Therefore, the list of file names in the folder "¥¥192.168.0.1¥SharedFiles¥POPFiles¥FolderA" and update date/time are acquired from the file server 300, and each of the acquired print files is compared with the printed information in the same way as described above. Subsequently, if one or more not-printed-yet files are discovered in the folder, the operation unit 20 determines that the last folder in FIG. 18 has not been printed yet.

Back to FIG. 15, the operation unit 20 displays the file list display screen (illustrated in FIG. 11) adding not-output-yet information (e.g., a badge indicating that the file has not been printed yet) on the thumbnail of the print file determined as not-printed-yet so that the user can recognize that the file has not been printed yet in S47.

As a result, the user may distinguish whether the print file has already been printed or the print file has not been printed yet visually, and the user may recognize whether the print file has already been printed or the print file has not been printed yet easily. For example, on the file list display screen D4 in FIG. 11, a badge P1a indicating that the file has not been printed yet on the thumbnail P1, and a badge P5a indicating that the file has not been printed yet on the thumbnail P5. As a result, it is possible to distinguish that the thumbnails P1 and P5 have not been printed yet visually.

In FIG. 15, the operation of displaying the file list display screen when the print application 50 is launched is described. However, it is possible to display the file list display screen at other occasions. More specifically, cases of timing when the file list display screen is displayed are accepting a command to redisplay the file list display screen and printing the print file. That is, in case of accepting input of a request to redisplay by user operation from the operation unit 20 or the print file is printed by the main unit 20, the memory 120 is searched through to check whether or not the server information exists, and the file list display screen is displayed in steps S41 to S47.

Figure 19:
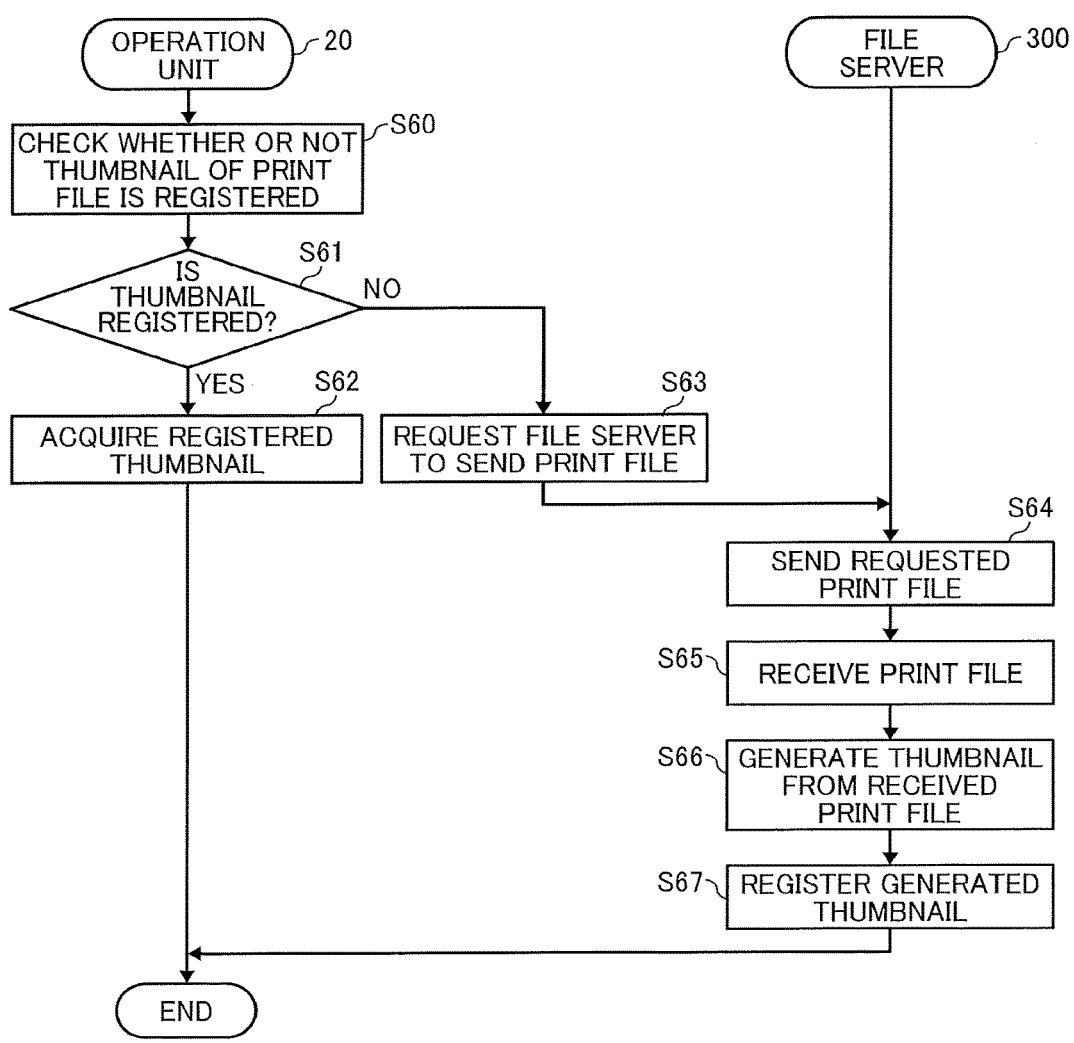
FIG. 19 is a flowchart illustrating an operation of generating a thumbnail in the MFP as an example embodiment of the present invention.

Next, the operation of generating the thumbnail of the print file is described below. In the MFP 100, in parallel with the operation of displaying the list of print files illustrated in FIG. 15, the operation of generating thumbnail is performed asynchronously. FIG. 19 is a flowchart illustrating an operation of generating a thumbnail in the MFP in this embodiment. In launching an application or displaying the file list display screen, if there is a print file without thumbnail among the list of file names acquired from the file server 300, the print application 50 acquires all print files to the operation unit 20 and generates thumbnails en bloc.

First, in displaying the file list display screen, with reference to the cache management information, the operation unit 20 searches through the memory 120 to check whether or not a thumbnail of a print file in S60. If the thumbnail is registered (YES in S61), the thumbnail registered in the memory 120 is acquired in S62.

By contrast, if the thumbnail is not registered (NO in S61), the operation unit 20 requests the file server 300 to transfer the print file in S63. The file server 300 transfers the requested print file to the operation unit 20 in S64.

The operation unit 20 receives the print file from the file server 300 in S65 and generates a thumbnail from the received print file in S66. The operation unit 20 registers the generated thumbnail in the memory 120 and registers information on the generated thumbnail in the cache management information.

Subsequently, in step S47 in FIG. 15, the operation unit 20 displays the file list display screen using the thumbnail acquired in S62 in FIG. 19 and the thumbnail generated in S66 in FIG. 19. In this case, based on the determination result in steps S45 and S46 in FIG. 15, the operation unit 20 displays a thumbnail of a print file that has not been printed yet adding the not-output-yet information (e.g., the badge indicating that the print file has not been printed yet) acquired from the memory 110.

Figure 20:
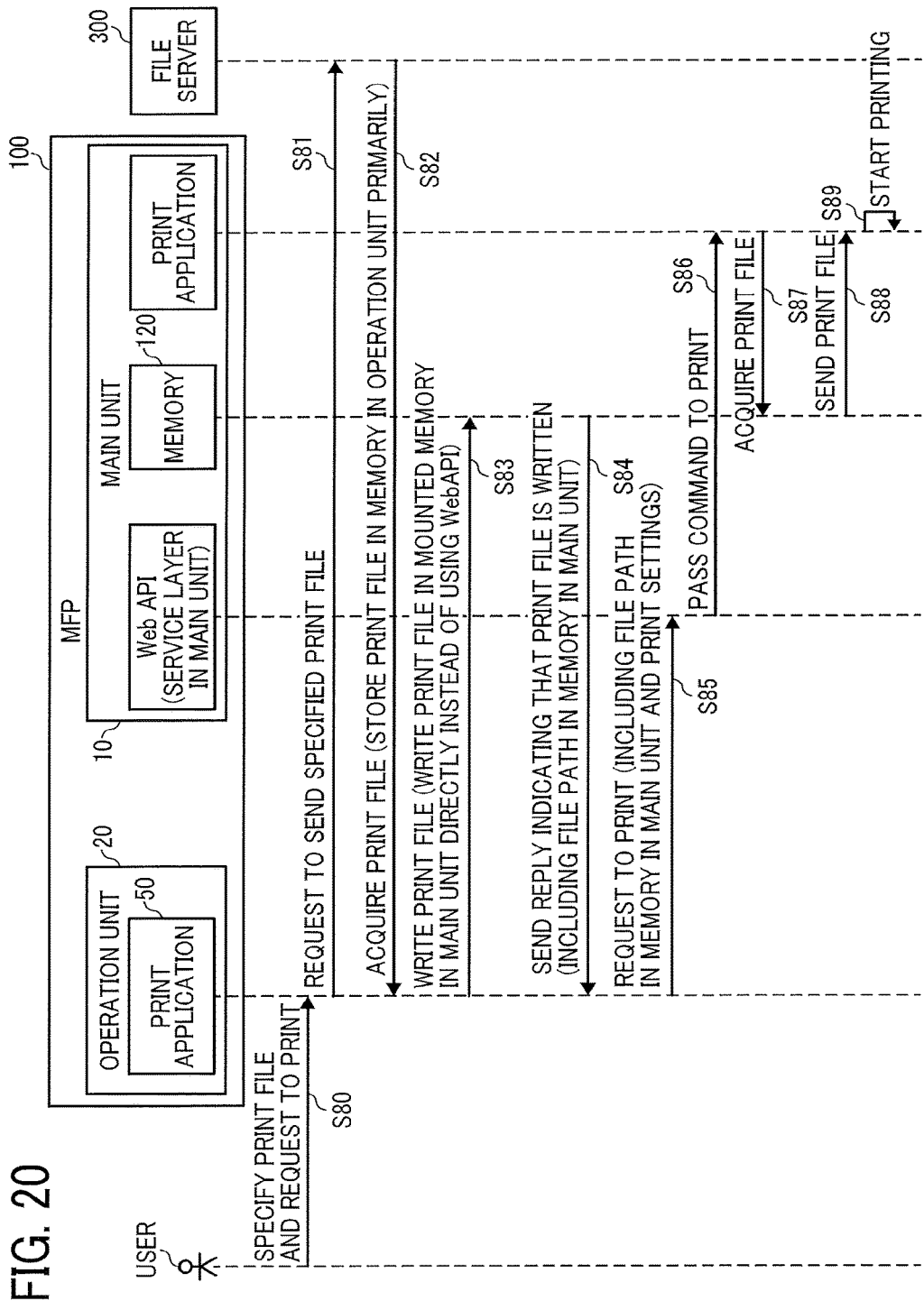
FIG. 20 is a sequence chart illustrating an operation of printing the print file in the MFP as an example embodiment of the present invention.

Next, when it is commanded to print from the print application 50 specifying the print file stored in the file server 300, an operation that acquires the specified print file from the file server 300 and prints the print file using the MFP 100 is described below. FIG. 20 is a sequence chart illustrating an operation of printing the print file in the MFP in this embodiment.

First, the print application 50 in the operation unit 20 accepts specification of a print file to be printed and a command to print by user operation in S80. Subsequently, the print application 50 requests the file server 300 to transfer the print file specified by user operation in S81. After acquiring the print file, the acquired print file is stored in the memory 110 in the operation unit 20 temporarily in S82.

Next, the print application 50 writes the acquired print file in the memory 120 in the main unit 10 in S83. In this case, the operation unit 20 mounts the memory 120 in the main unit 10, and the print application 50 writes (stores) the print file in the memory 120 in the main unit 10 just like a local folder in the operation unit 20. Here, when the operation unit 20 writes the print file in the main unit 10, the print file is directly written instead of using WebAPI of the main unit 10.

After finishing writing the print file, a response indicating that it is finished to write the print file (i.e., a notification of finishing writing) is transferred to the operation unit 20 in S84. In this case, a file path of the memory 120 is included in the response of finishing writing in the memory 120 in the main unit 10.

Here, in case of writing (storing) the print file in the memory 120 in the main unit 10 using WebAPI in the main unit 10, after the operation unit 20 commands WebAPI in the main unit 10 to write, the file path of the memory 120 in the main unit 10 is returned from WebAPI to the operation unit 20, and the operation of writing is performed using the file path.

Next, the print application 50 transfers a command to print (a command to output) including the file path of the print file stored in the memory 120 and print settings (output settings) to WebAPI in the main unit 10 in S85. After receiving the command to print, the WebAPI in the main unit 10 passes the command to print to the print application in the main unit 10 in S86. As a result, the print application tries to acquire the print file based on the received command to print from the memory 120 to acquire the print file in steps S87 and S88. Accordingly, the print application prints the acquired print file in S89. Subsequently, the operation unit 20 registers information such as the file name of the printed print file and update date/time etc. in the printed information in the memory 120.

After accepting selection of a thumbnail from the print application 50 and pressing the print button by user operation, the print application 50 acquires the print file from the file server 300 in the operation unit 20, writes the print file from the operation unit 20 in the main unit 10, and transfers the command to print thoroughly.

Figure 21:
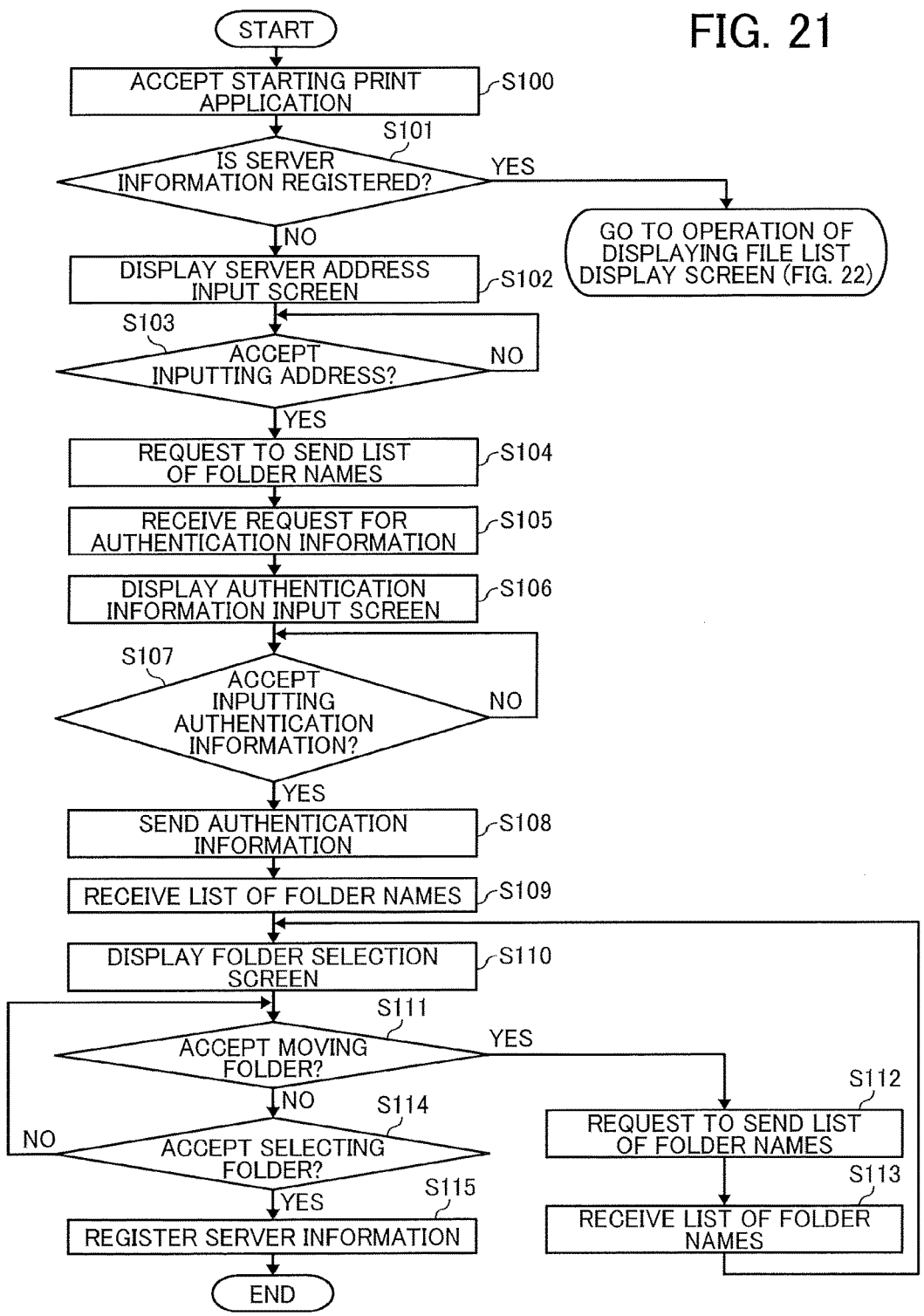
FIG. 21 is a flowchart illustrating an operation of registering the server information in the MFP as an example embodiment of the present invention.

Next, an operation of registering the server information in the MFP 100 is described below. FIG. 21 is a flowchart illustrating an operation of registering the server information in the MFP in this embodiment.

First, after the input acceptance unit 101 accepts launch of the print application 50 by user operation in S100, the acquisition unit 104 determines whether or not the server information is registered in the memory 120 in S101. If the server information is registered (YES in S101), the step proceeds to an operation of displaying the file list display screen in FIG. 22.

By contrast, if the server information is not registered in the memory 120 (NO in S101), the MFP 100 determines that the file server 300 has never been connected to the MFP 100, and the display controller 102 displays the server address input screen (with reference to FIG. 8) in S102.

The input acceptance unit 101 waits until input of the address of the file server by user operation from the server address input screen is accepted (NO in S103). If the input acceptance unit 101 accepts input of the address of the file server 300 (YES in S103), the print application 50 requests the file server 300 to transfer the list of folder names via the connection controller 108, the connection controller 123, and the communication controller 121 in S104.

Next, the print application 50 receives a request for authentication information transferred by the file server 300 via the connection controller 108, the connection controller 123, and the communication controller 121 in S105. The display controller 102 displays an authentication information input screen for inputting the authentication information (with reference to FIG. 9) in S106.

The input acceptance unit 101 waits until input of authentication information from the authentication information input screen is accepted (NO in S107) If the input acceptance unit 101 accepts input of the authentication information (YES in S107), the print application 50 transfers the authentication information to the file server 300 via the connection controller 108, the connection controller 123, and the communication controller 121 in S108.

If the operation of authenticating user succeeds in the file server 300, the print application 50 receives the list of folder names transferred by the file server 300 via the connection controller 108, the connection controller 123, and the communication controller 121 in S109. Based on the received folder names, the display controller 102 displays the folder selection screen (with reference to FIG. 10) in S110.

If the input acceptance unit 101 accepts move of a current folder (YES in S111), via the connection controller 108, the connection controller 123, and the communication controller 121, the print application 50 requests the file server 300 a list of folder names included in the lower layer in S112 and receives the list of folder names in S113. Subsequently the operation goes back to step S110.

By contrast, if the input acceptance unit 101 does not accept move of a current folder (NO in S111) but accepts selection of a folder (YES in S114), the registration controller 105 determines the selected folder as the root folder and registers the address of the file server 300, authentication information, and root folder as the server information in the memory 120 in S115.

If the input acceptance unit 101 neither accepts move of a current folder (NO in S111) nor accepts selection of a folder (NO in S114), the operation goes back to S111, and the operation is repeated.

Figure 22:
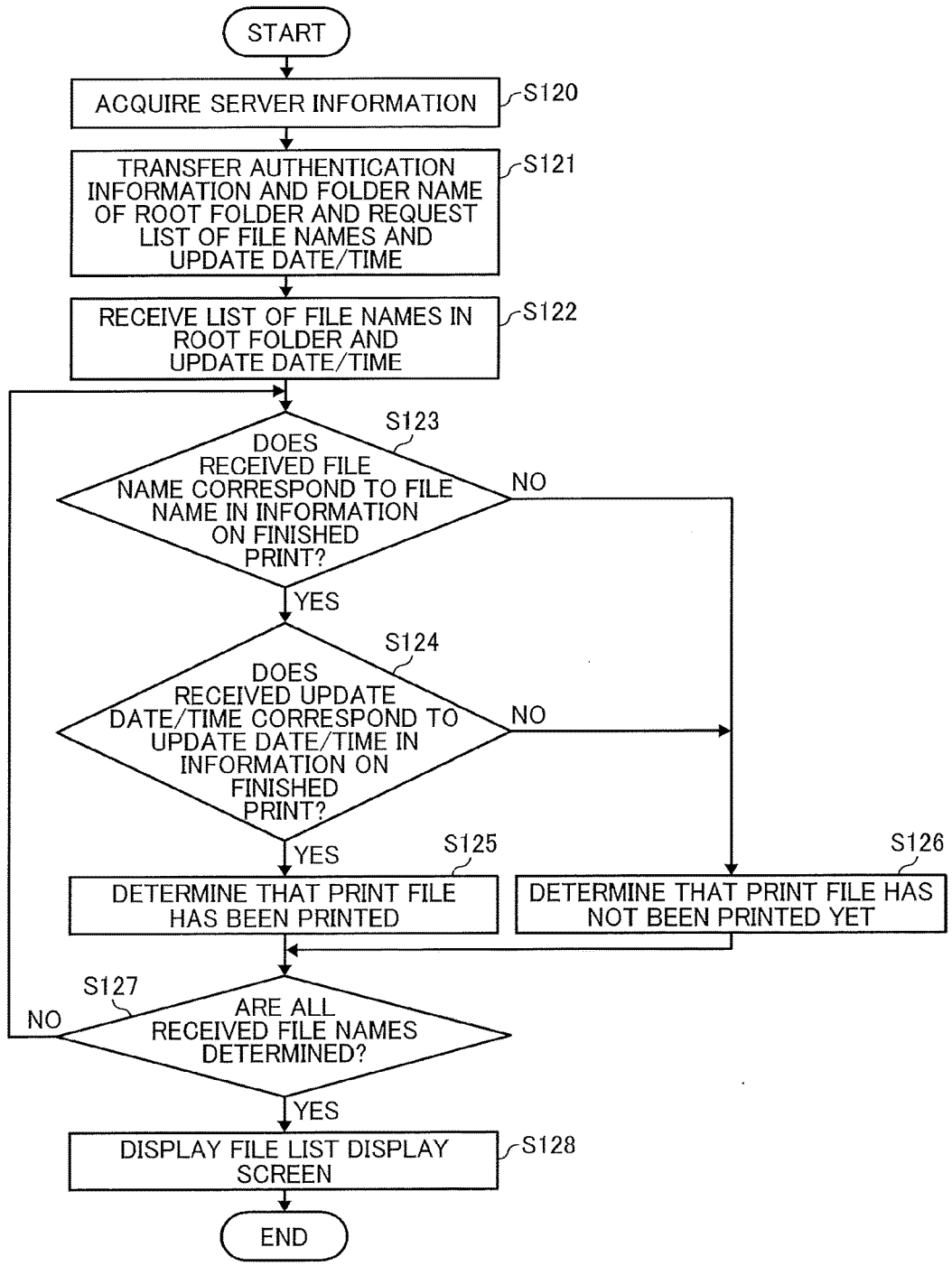
FIG. 22 is a flowchart illustrating an operation of displaying the file list display screen in the MFP as an example embodiment of the present invention.

Next, if the server information is registered in the MFP 100, an operation of displaying the file list display screen (with reference to FIG. 11) is described below. FIG. 22 is a flowchart illustrating an operation of displaying the file list display screen in the MFP in this embodiment.

In S101 in FIG. 21, if the server information is registered in the memory 120 (YES in S101), the acquisition unit 104 acquires the server information from the memory 120 in S120.

Next, via the connection controller 108, the connection controller 123, and the communication controller 121, the print application 50 transfers the authentication information and the folder name of the root folder included in the server information to the file server 300 and requests the file server 300 to transfer the list of file names and update date/time (with reference to FIG. 16) in S121. Subsequently, via the connection controller 108, the connection controller 123, and the communication controller 121, the print application 50 receives the list of file names of print files stored in the root folder and update date/time (with reference to FIG. 18) from the file server 300 in S122.

Next, the determination unit 106 determines whether or not the received file name corresponds to the file name in the printed information registered in the memory 120 in S123. If both file names do not correspond (NO in S123), the determination unit 106 determines that the print file indicated by the file name has not been printed yet in S126.

By contrast, if both file names corresponds (YES in S123), the determination unit 106 determines whether or not the update date/time of the print file indicated by the file name determined as corresponds (i.e., received update date/time) corresponds with the update date/time of the print file whose file name corresponds in the printed information in S124. If both update date/time do not correspond (NO in S124), the determination unit 106 determines that the print file indicated by the file name has not been printed yet in S126.

By contrast, if both file names correspond (YES in S124), the determination unit 106 determines that the print file indicated by the file name has already been printed in S125. The determination unit 106 determines whether or not all received file names have been determined in S127. If not all file names have been determined yet (NO in S127), the operation goes back to step S123, and the determination operation is repeated in S123 to S126.

By contrast, if all file names have been determined (YES in S127), the display controller 102 displays the file list display screen (with reference to FIG. 11) adding the not-output-yet information (e.g., the badge indicating that the print file has not been printed yet) acquired from the memory 110 to the print file determined as not-printed-yet in S128.

Figure 23A:
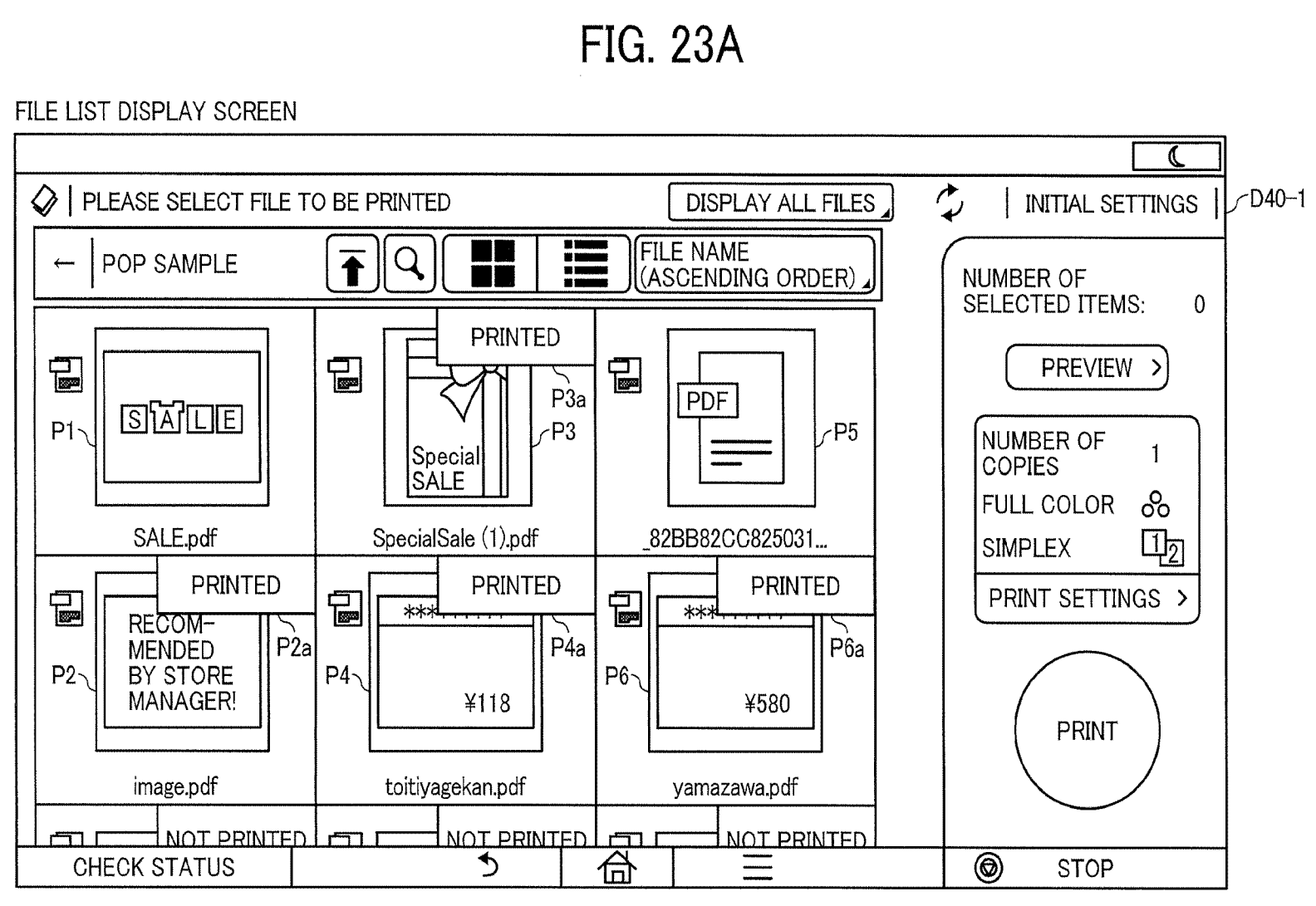

In S128 in FIG. 22, the file list display screen (with reference to FIG. 11) is displayed adding the badge as the not-output-yet information to the print file that has not been printed yet. In this case, it is possible to display the file list display screen by adding the badge as the output information to the print file that has already been printed instead of the badge as the not-output-yet information. Otherwise, it is possible to display the file list display screen adding both the badge as the not-output-yet information and the badge as the output information. A description is given below with reference to figures. FIGS. 23A and 23B are diagrams illustrating other file list display screens in this embodiment.

For example, as illustrated in FIG. 23A, in a file list display screen D40-1, thumbnails P1 to P6 of print files are displayed. On thumbnails P2, P3, P4, and P6 of printed print files, on the upper right of thumbnails, badges P2a, P3a, P4a, and P6a (output information) indicating that the print file has already been printed are added respectively. As a result, it is possible to specify a printed print file and recognize that print files indicated by thumbnails P1 and P5 without badge have not been printed yet by user recognition.

Accordingly, by specifying print files without badge, it is possible to print out those print files that have not been printed yet.

In addition, for example, as illustrated in FIG. 23B, in a file list display screen D40-2, thumbnails P1 to P6 of print files are displayed. On the thumbnails P1 and P5 for the print files that have not been printed yet, badges P1a and P5a indicating that the print files have not been printed yet are attached and displayed on the upper right of the thumbnails respectively. On thumbnails P2, P3, P4, and P6 of printed print files, on the upper right of thumbnails, badges P2a, P3a, P4a, and P6a indicating that the print file has already been printed are added respectively. As a result, it is possible to specify the print file that has not been printed yet and print file that has already been printed, and it is possible for a user to recognize that the print files indicated by the thumbnails P1 and P5 have not been printed yet by user recognition. Subsequently, after specifying the print file that the badges P1a and P5a as the not-output-yet information are attached by user operation, it is possible to print out the print file that has not been printed yet.

As described above, in printing the print file stored in the file server 300, the MFP 100 in this embodiment registers the printed information (i.e., date/time when the print file is printed, file name, and update date/time) in the memory 120 in the MFP 100. Subsequently, in displaying the list of print files on the file list display screen, depending on whether or not each of the print files corresponds to the file name and the update date/time in the printed information, it is determined whether or not the print file stored in the file server 300 has already been printed. After that, the print file list display screen is displayed by adding the not-output-yet information (e.g., the badge indicating that the print file has not been printed yet) to the print file determined that the print file has not been printed yet. As a result, in the environment that the file server commercially manufactured and the MFP 100 are connected, instead of adding a function to the file server, by installing the application in the MFP 100 or the operation unit 20 only, multiple MFPs itself (i.e., the MFPs 100 and 200 etc.) may easily manage the printing status indicating whether or not the print file stored in the file server has already been printed using the MFP 100, and it is possible to display the printing status visually so that the user can easily distinguish the printing status.

Here, in the image processing system in this embodiment described above, in printing the print file received from the file server 300, the file list display screen is displayed. However, no limitation is intended thereby. That is, in addition to printing the print file, the file list display screen may be displayed in scanning and sending a file, sending e-mail attaching a file, transferring a file, and transferring facsimile.

It should be noted that the program executed by the MFP 100 in this embodiment (i.e., the print application 50) is provided by being embedded in a storage device such as the ROM etc. preliminarily. The program may be provided by being stored in a computer readable, recording medium, such as a compact disc read only memory (CD-ROM), a flexible disk (FD), a compact disc recordable (CD-R), and a digital versatile disc (DVD) etc., in a file format installable or executable.

In addition, it is possible to store the program executed by the MFP 100 in this embodiment (i.e., the print application 50) in a computer connected to a network such as the Internet etc. and provide the program by downloading the program via the network. Furthermore, it is possible to provide and distribute the program executed by the MFP 100 in this embodiment via the network such as the Internet etc.

The program executed by the MFP 100 in this embodiment (i.e., the print application 50) has a module configuration including various functional units described above (i.e., the input acceptance unit, the display controller, the communication controller, the acquisition unit, the registration controller, the determination unit, and the thumbnail generator). Regarding actual hardware, the functional units described above are loaded to the main memory and generated on the main memory by reading the program from the ROM described above and executing the program by the CPU (processor). For example, a part of the functional units or all functional units described above may be implemented by a dedicated hardware circuit.

In this embodiment, the case that the image processing apparatus in this embodiment is applied to the MFP including at least two or more functions among copy function, print function, scan function, and facsimile function. However, the image processing apparatus in this embodiment may be applied to any one of image processing apparatuses that include a display panel such as a copier, printer, scanner, and facsimile etc.

In this embodiment, the image processing apparatus connected to the file server commercially produced that may manage the output status indicating whether or not the file to be printed stored in the file server has already been output by using the image processing apparatus and display the output status easily recognized by user recognition.

In the above-described example embodiment, a computer can be used with a computer-readable program, described by object-oriented programming languages such as C++, Java®, JavaScript®, Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image processing apparatus, comprising:
a main unit including:
an image forming engine configured to output at least one file, and
first circuitry that operates under control of a first operating system (OS); and an operation unit including:
a control panel configured to display information and receive instructions to control the main unit, and
second circuitry that operates under control of a second OS, the second circuitry causing the control panel to display information and receive instructions to control the main unit, the second circuitry being configured to:
receive file identification information corresponding to a plurality of files;
cause the control panel to display thumbnail images corresponding to the plurality of files;
receive a selection indicating a selected at least one file of the plurality of files;
command the image forming engine to output the selected at least one file;
store output information of the selected at least one file in a memory, the output information including file identification information of the selected at least one file; and
cause the control panel to display, based on the stored output information, a screen indicating that the selected at least one file has been output, and indicating at least one of the plurality of files has not been output,
wherein:
the main unit further includes the memory and a web application programming interface (WebAPI),
the second circuitry is further configured to:
in response to receiving a command for outputting the selected at least one file that is stored in an external apparatus, transfer the selected at least one file from the external apparatus to the operation unit;
store the selected at least one file being transferred in the memory, the memory being mounted on the operation unit; and
send an output command to the WebAPI in the main unit, the output command including a file path of the selected at least one file stored in the memory and an output setting, to control the image forming engine to output the selected at least one file based on the output command using the WebAPI.

2. The image processing apparatus according to claim 1, wherein the file identification information includes a file name uniquely assigned to the selected at least one file.

3. The image processing apparatus according to claim 2, wherein the file identification information further includes update date and time which indicate when the selected at least one file is updated, and
the second circuitry adds non-output information to the at least one of the plurality of files which has not been output, the at least one of the plurality of files which has not been output having at least one of a file name and an update date and time that does not correspond to the file name and the update date and time included in the output information.

4. The image processing apparatus according to claim 2, wherein the file name includes location information indicating a location of the selected at least one file in the external apparatus.

5. The image processing apparatus according to claim 3, wherein the output information further includes output date and time when the selected at least one file is output, in association with the file name and the update date and time.

6. The image processing apparatus according to claim 5, wherein the second circuitry further:
registers, when the selected at least one file of the plurality of files is output, the output date and time in association with the file name of the selected at least one file of the plurality of files that is output and the update date and time in the memory.

7. The image processing apparatus according to claim 6, wherein:
the second circuitry further requests, when the selected at least one file is output, an external apparatus to transfer the file identification information and update dates and times for the selected at least one file.

8. The image processing apparatus according to claim 1, wherein the second circuitry further:
accepts an instruction for activating an application for outputting the selected at least one file; and
requests an external apparatus to transfer a list of file names and update dates and times for the selected at least one file.

9. The image processing apparatus according to claim 1, wherein the second circuitry further:
accepts an input of a command to redisplay the thumbnail images; and
requests an external apparatus to transfer the file identification information.

10. The image processing apparatus according to claim 1, wherein the second circuitry further:
receives a list of folder names each identifying a folder that stores the selected at least one file;
causes the control panel to display a list of folders each identified with the folder name being received;
accepts a selection of at least one folder to be registered as a root folder from the list of folders being displayed;
registers a folder name of the folder being selected as the root folder in the memory; and
receives file names of the selected at least one file and update dates and times stored in the root folder from an external apparatus.

11. The image processing system according to claim 1, wherein:
the second circuitry communicates using Server Message Block (SMB) protocol.

12. The image processing apparatus according to claim 1, wherein the second circuitry is further configured to:
cause the control panel to display an input screen for inputting an address of an external apparatus; and
in response to receiving an instruction for switching a screen after an input of the address of the external apparatus, transfer a command for transferring information on a folder that stores the selected at least one file, to the external apparatus corresponding to the address which has been input.

13. A method for processing images in a device having a main unit which includes an image forming engine configured to output at least one file, and first circuitry that operates under control of a first operating system (OS); and an operation unit which includes a control panel configured to display information and receive instructions to control the main unit, second circuitry that operates under control of a second OS, the second circuitry causing the control panel to display information and receive instructions to control the main unit, the method comprising:

receiving file identification information corresponding to a plurality of files;

displaying thumbnail images corresponding to the plurality of files;

receiving a selection indicating a selected at least one file of the plurality of files;

commanding the image forming engine to output the selected at least one file;

storing output information of the selected at least one file in a memory, the output information including file identification information of the selected at least one file; and displaying, based on the stored output information, a screen indicating that the selected at least one file has been output, and indicating at least one of the plurality of files has not been output, wherein:

the main unit further includes the memory and a web application programming interface (WebAPI), and the method further includes:

in response to receiving a command for outputting the selected at least one file that is stored in an external apparatus, transferring the selected at least one file from the external apparatus to the operation unit;

storing the selected at least one file being transferred in the memory, the memory being mounted on the operation unit; and sending an output command to the WebAPI in the main unit, the output command including a file path of the selected at least one file stored in the memory and an output setting, to control the image forming engine to output the selected at least one file based on the output command using the WebAPI.

14. A non-transitory computer-readable recording medium used with a device having a main unit which includes an image forming engine configured to output at least one file, and first circuitry that operates under control of a first operating system (OS); and an operation unit which includes a control panel configured to display information and receive instructions to control the main unit, and second circuitry that operates under control of a second OS, the second circuitry causing the control panel to display information and receive instructions to control the main unit, the medium storing a program that, when executed causes an implementation of a method comprising:

receiving file identification information corresponding to a plurality of files;

displaying thumbnail images corresponding to the plurality of files;

receiving a selection indicating a selected at least one file of the plurality of files;

commanding the image forming engine to output the selected at least one file;

storing output information of the selected at least one file in a memory, the output information including file identification information of the selected at least one file; and displaying, based on the stored output information, a screen indicating that the selected at least one file has been output, and indicating at least one of the plurality of files has not been output, wherein:

the main unit further includes the memory and a web application programming interface (WebAPI), and the method further includes:

in response to receiving a command for outputting the selected at least one file that is stored in an external apparatus, transferring the selected at least one file from the external apparatus to the operation unit;

storing the selected at least one file being transferred in the memory, the memory being mounted on the operation unit; and sending an output command to the WebAPI in the main unit, the output command including a file path of the selected at least one file stored in the memory and an output setting, to control the image forming engine to output the selected at least one file based on the output command using the WebAPI.

* * * * *